(12) United States Patent
Johnson et al.

(10) Patent No.: US 6,790,934 B2
(45) Date of Patent: Sep. 14, 2004

(54) METHOD FOR PURIFICATION OF AROMATIC POLYETHERS

(75) Inventors: Norman Enoch Johnson, Mt. Vernon, IN (US); Raul Eduardo Ayala, Clifton Park, NY (US); Thomas Joseph Fyvie, Schenectady, NY (US); Amy Rene Freshour, Putte (NL); David Winfield Woodruff, Clifton Park, NY (US); Peter David Phelps, Schenectady, NY (US); Ganesh Kailasam, Evansville, IN (US); Paul Edward Howson, Latham, NY (US); Elliott West Shanklin, Altamont, NY (US); Lioba Maria Kloppenburg, Mt. Vernon, IN (US); David Bruce Hall, Ballston Lake, NY (US); Pradeep Jeevaji Nadkarni, Bangalore (IN); Daniel Joseph Brunelle, Burnt Hills, NY (US)

(73) Assignee: General Electric Company, Niskayuna, NY (US)

( * ) Notice: Subject to any disclaimer, the term of this patent is extended or adjusted under 35 U.S.C. 154(b) by 361 days.

(21) Appl. No.: 10/034,866

(22) Filed: Dec. 21, 2001

(65) Prior Publication Data

US 2002/0151675 A1 Oct. 17, 2002

Related U.S. Application Data

(63) Continuation-in-part of application No. 09/634,161, filed on Aug. 9, 2000, now abandoned.
(60) Provisional application No. 60/154,764, filed on Sep. 20, 1999.

(51) Int. Cl.$^7$ ................................................ C08G 6/06
(52) U.S. Cl. ........................ 528/499; 528/125; 528/126; 528/127; 528/145; 528/149; 528/170; 528/491; 528/497; 528/500; 528/503; 210/633; 210/634; 210/660
(58) Field of Search ................................ 528/125, 126, 528/127, 145, 149, 170, 491, 497, 499, 500, 503; 210/633, 634, 660

(56) References Cited

U.S. PATENT DOCUMENTS

| | | |
|---|---|---|
| 3,787,364 A | 1/1974 | Wirth et al. |
| 3,838,097 A | 9/1974 | Wirth et al. |
| 3,847,869 A | 11/1974 | Williams |
| 5,229,482 A | 7/1993 | Brunelle |
| 5,514,813 A | 5/1996 | Brunelle |
| 5,663,275 A | 9/1997 | Schmidhauser |
| 5,830,974 A | 11/1998 | Schmidhauser et al. |

OTHER PUBLICATIONS van Dort, H.M. et al, "Poly–p–Phenylene Oxide", European Polymer journal, vol. 4, pp. 275–287 (1968).
Percec, V. et al., "Phase Transfer Catalyzed Polymerization of 4–Bromo–2,6–Dimethylphenol in the Presence of Either 2,4,6–Trimethylphenol or 4–tert–Butyl–2,6–Dimethylphenol", Journal of Polymer Science: Part A: Polymer Chemistry, vol. 29, pp. 63–82 (1991).

*Primary Examiner*—Samuel A. Acquah
(74) *Attorney, Agent, or Firm*—Noreen C. Johnson; Christian G. Cabou

(57) ABSTRACT

Aromatic polyethers are prepared by displacement polymerization reaction in the presence of a water-immiscible solvent with boiling point at atmospheric pressure of greater than 110° C. and a density ratio to water of greater than 1.1:1 at 20–25° C. The polyethers are purified by processes comprising aqueous extraction, or filtration, or a combination thereof.

112 Claims, No Drawings

METHOD FOR PURIFICATION OF AROMATIC POLYETHERS

CROSS REFERENCE TO RELATED APPLICATIONS

This application is a continuation-in-part of U.S. application Ser. No. 09/634,161, filed Aug. 9, 2000 now abandoned, which claims the benefit of U.S. Provisional Application No. 60/154,764, filed Sep. 20, 1999, which applications are incorporated herein by reference.

BACKGROUND OF THE INVENTION

The present invention relates to methods for purification of aromatic polyethers, and more particularly to methods for purification of aromatic polyetherimides.

Various types of aromatic polyethers, particularly polyetherimides, polyethersulfones, polyetherketones, and polyetheretherketones have become important as engineering resins by reason of their excellent properties. These polymers are typically prepared by the reaction of salts of dihydroxyaromatic compounds, such as bisphenol A (BPA) disodium salt, with dinitroaromatic molecules or dihaloaromatic molecules. Examples of suitable dihaloaromatic molecules include bis(4-fluorophenyl) sulfone, bis(4-chlorophenyl)sulfone, and the analogous ketones and bisimides as illustrated by 1,3-bis[N-(4-chlorophthalimido)] benzene.

According to U.S. Pat. No. 5,229,482, the preparation of aromatic polyethers by displacement polymerization may be conducted in the presence of a relatively non-polar solvent, using a phase transfer catalyst which is substantially stable under the temperature conditions employed. Suitable catalysts include ionic species such as guanidinium salts. Suitable solvents disclosed therein include o-dichlorobenzene, dichlorotoluene, 1,2,4-trichlorobenzene and diphenyl sulfone.

It is desirable to isolate aromatic polyether from a reaction mixture (or other type of mixture such as recovery from a mixed recycle stream solution) free from contaminating species that may affect the polymer's final properties in typical applications. In a typical halide displacement polymerization process contaminating species often include alkali metal halide and other alkali metal salts, residual monomer species, and residual catalyst species. For maximum efficiency of operation it is desirable to recover any solvent employed and other valuable compounds such as catalyst species, and to provide waste streams which do not contaminate the environment. In particular it is often desirable to recover alkali metal halide, especially sodium chloride, for recycle to a brine plant for production of sodium hydroxide and chlorine.

Many conventional techniques are used to purify polymer-containing organic solutions. For instance, extraction with water and settling by gravity in a mixer/settling tank have been used for removal of aqueous-soluble species. However, water extraction methods will not work when the water phase emulsifies with or does not phase separate efficiently from the organic phase. The particular case of polyethers in chlorinated aromatic hydrocarbon solvents often presents special difficulties when mixing with water and separating by settling. Depending upon such factors as polymer concentration and temperature, the organic solution may be particularly viscous making efficient washing with an aqueous phase difficult. Variations in either temperature of operation in the range of about 20–180° C. or in polymer concentration may promote settling due to density differences, but the presence of surface-active functional groups on the polymer may still promote emulsification, particularly the presence of ionic end-groups such as phenoxide and/or carboxylate left uncapped from the polymerization process. Another constraint is that the time for separation of the aqueous and organic phases must be fast, preferably on the order of minutes, so that separation rates do not slow down production. A method is needed that minimizes emulsification and is relatively fast for phase separation of the water and organic phases.

Dry filtration via filters or membranes has also been employed for the removal of relatively large suspended solids from polymer-containing organic solutions. The advantage is that no process water is needed, but the disadvantage is that the filter type has to be chosen carefully to avoid a high pressure drop as the solids cake builds. Filtration is not feasible if the solid particles plug, blind, or go through the porous filter media. Easy back flushing of the filter is also required for fast turn-around and repeated use. Alkali metal halides, such as sodium chloride, are typically insoluble in organic solvents such as chlorinated aromatic-hydrocarbons, but such halides may be present as small suspended solid crystals that are difficult to remove by standard filtration methods. Furthermore, residual monomer species such as alkali metal salts of monomer or complexes of catalyst and monomer may also be present which often cannot be efficiently removed by filtration alone.

Because of the unique separation problems involved, new methods are needed for efficiently separating aromatic polyether products from contaminating species in chlorinated aromatic hydrocarbons. Methods are also required for recycling the solvent arid for recovering useful catalyst and alkali metal halide species from any final waste stream.

BRIEF SUMMARY OF THE INVENTION

After careful study the present inventors have discovered methods for purifying aromatic polyethers prepared in water-immiscible solvents with a density ratio to water of greater than about 1.1:1 at 20–25° C. These new methods also provide efficient recovery of solvent, alkali metal halide, and valuable catalyst species.

In one of its aspects the present invention provides a method for purifying a mixture comprising (i) an aromatic polyether reaction product made by a halide displacement polymerization process, (ii) a catalyst, (iii) an alkali metal halide, and (iv) a substantially water-immiscible organic solvent with boiling point at atmospheric pressure of greater than 110° C. and a density ratio to water of greater than 1.1:1 at 20–25° C., comprising the steps of:

(a) quenching the mixture with acid; and (b) at least one step of contacting a polyether-containing organic phase with water and separating a water-containing phase from the organic phase, which step comprises using at least one of a liquid/liquid centrifuge, a solid/liquid centrifuge, a counter-current contact apparatus, a liquid-liquid extractor, a liquid-liquid continuous extractor, an extraction column, a static mixer, a coalescer, a homogenizer, or a mixing/settling vessel.

In another of its aspects the present invention provides a method for purifying a mixture comprising (i) an aromatic polyether reaction product made by a halide displacement polymerization process, (ii) a catalyst, (iii) an alkali metal halide, and (iv) a substantially water-immiscible organic solvent with boiling point at atmospheric pressure of greater than 110° C. and a density ratio to water of greater than 1.1:1 at 20–25° C., comprising the steps of:

(a) subjecting the mixture to at least one solid separation step;

(b) quenching the mixture with acid; and (c) extracting the organic solution at least once with water.

In still another of its aspects the present invention provides a method for purifying a mixture comprising (i) an aromatic polyether reaction product made by a halide displacement polymerization process, (ii) a catalyst, (iii) an alkali metal halide, and (iv) a substantially water-immiscible organic solvent with boiling point at atmospheric pressure of greater than 110° C. and a density ratio to water of greater than 1.1:1 at 20–25° C., comprising: at least one solid separation step, and at least one ion exchange step.

In still another of its aspects the present invention provides a method for purifying a mixture comprising (i) an aromatic polyether reaction product made by a halide displacement polymerization process, (ii) a catalyst, (iii) an alkali metal halide, and (iv) a substantially water-immiscible organic solvent with boiling point at atmospheric pressure of greater than 110° C. and a density ratio to water of greater than 1.1:1 at 20–25° C., comprising the steps of:

(a) providing to the mixture an amount of water in a range between about 0.005 wt. % and about 10 wt. % based on weight of polyether;

(b) mixing the phases, wherein a portion of alkali metal halide is in a form that can be separated by a solid separation step following mixing; and (c) subjecting the mixture to at least one solid separation step.

DETAILED DESCRIPTION OF THE INVENTION

The polyethers of the present invention are typically derived from combining at least one dihydroxy-substituted aromatic hydrocarbon moiety and at least one substituted aromatic compound of the formula (I):

$$Z(A^1—X^1)_2 \qquad (I)$$

wherein Z is an activating radical, $A^1$ is an aromatic radical and $X^1$ is fluoro, chloro, bromo, or nitro, in the presence of a catalytically active amount of a phase transfer catalyst. In one suitable procedure at least one alkali metal salt of at least one dihydroxy-substituted aromatic hydrocarbon is combined with at least one substituted aromatic compound of generic formula (I). The alkali metal salts of dihydroxy-substituted aromatic hydrocarbons which are employed are typically sodium or potassium salts. Sodium salts are frequently used for reason of their availability and relatively low cost. Said salt may be employed in anhydrous form. However, in certain instances the employment of a hydrate, such as the hexahydrate of the bisphenol A sodium salt, may be advantageous provided water of hydration is removed before the substituted aromatic compound is introduced.

Suitable dihydroxy-substituted aromatic hydrocarbons include those having the formula (II):

$$HO—A^2—OH \qquad (II)$$

wherein $A^2$ is a divalent aromatic hydrocarbon radical. Suitable $A^2$ radicals include m-phenylene, p-phenylene, 4,4'-biphenylene, 4,4'-bi(3,5-dimethyl)phenylene, 2,2-bis(4-phenylene)propane and similar radicals such as those which correspond to the dihydroxy-substituted aromatic hydrocarbons disclosed by name or formula (generic or specific) in U.S. Pat. No. 4,217,438.

In various embodiments the $A^2$ radical has the formula (III):

$$—A^3—Y—A^4—, \qquad (III)$$

wherein each of $A^3$ and $A^4$ is a monocyclic divalent aromatic hydrocarbon radical and Y is a bridging hydrocarbon radical in which one or two atoms separate $A^3$ from $A^4$. The free valence bonds in formula (III) are usually in the meta or para positions of $A^3$ and $A^4$ in relation to Y. Compounds in which $A^2$ has formula (III) are bisphenols, and for the sake of brevity the term "bisphenol" is sometimes used herein to designate the dihydroxy-substituted aromatic hydrocarbons; it should be understood, however, that non-bisphenol compounds of this type may also be employed as appropriate.

In formula (III) the $A^3$ and $A^4$ values may be unsubstituted phenylene, or halo or hydrocarbon-substituted derivatives thereof, illustrative substituents (one or more) being alkyl, alkenyl, bromo or chloro. Unsubstituted phenylene radicals are employed in certain embodiments. In some embodiments both $A^3$ and $A^4$ are p-phenylene, although both may be o- or m-phenylene or one o- or m-phenylene and the other p-phenylene.

The bridging radical, Y, is one in which one or two atoms separate $A^3$ from $A^4$. Illustrative radicals of this type include gem-alkylene (alkylidene) radicals; methylene, cyclohexylmethylene, 2-[2.2.1]-bicycloheptylmethylene, ethylene, isopropylidene, neopentylidene, cyclohexylidene, cyclopentadecylidene, cyclododecylidene and adamantylidene. Also included are unsaturated radicals.

Suitable dihydroxy-substituted aromatic hydrocarbons also include those containing indane structural units such as represented by the formula (IV), which compound is 3-(4-hydroxyphenyl)-1,1,3-trimethylindan-5-ol, and by the formula (V), which compound is 1-(4-hydroxyphenyl)-1,3,3-trimethylindan-5-ol:

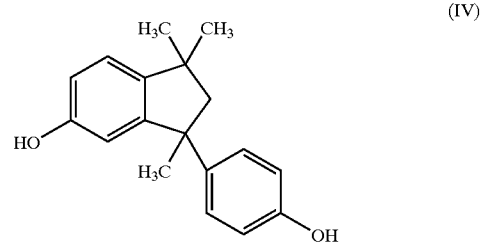

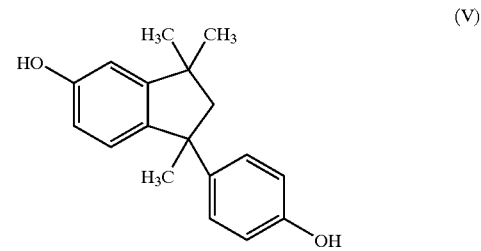

Also included among suitable dihydroxy-substituted aromatic hydrocarbons are the 2,2,2'2,'-tetrahydro-1,1'-spirobi[1H-indene]diols having formula (VI):

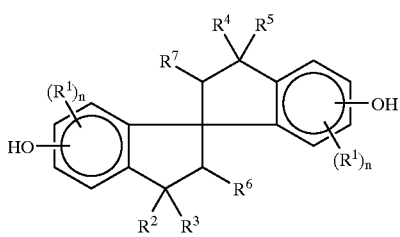

(VI)

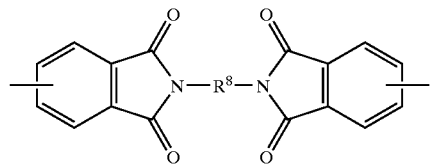

(VII)

wherein each $R^1$ is independently selected from monovalent hydrocarbon radicals and halogen radicals; each $R^2$, $R^3$, $R^4$, and $R^5$ is independently $C_{1-6}$ alkyl; each $R^6$ and $R^7$ is independently H or $C_{1-6}$ alkyl; and each n is independently selected from positive integers having a value of from 0 to 3 inclusive. A particular 2,2,2',2'-tetrahydro-1,1'-spirobi[1H-indene]-diol is 2,2,2',2'-tetrahydro-3,3,3',3'-tetramethyl-1,1'-spirobi[1H-indene]-6,6'-diol.

Some illustrative examples of dihydric phenols of formula (II) include 6-hydroxy-1-(4'-hydroxyphenyl)-1,3,3-trimethylindane, 4,4'-(3,3,5-trimethylcyclohexylidene) diphenol; 1,1-bis(4-hydroxy-3-methylphenyl)cyclohexane; 2,2-bis(4-hydroxyphenyl)propane (commonly known as bisphenol-A); 2,2-bis(4-hydroxy-3,5-dimethylphenyl) propane; 4,4-bis(4-hydroxyphenyl)heptane; 2,2-bis(4-hydroxy-3-methylphenyl)propane; 2,2-bis(4-hydroxy-3-ethylphenyl)propane; 2,2-bis(4-hydroxy-3-isopropylphenyl) propane; 3,5,3',5'-tetrachloro-4,4'-dihydroxyphenyl) propane; 2,4'-dihydroxyphenyl sulfone; 2,4'-dihyroxydiphenylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(3-phenyl-4-hydroxyphenyl)propane; bis(4-hydroxyphenyl) cyclohexylmethane; 2,2-bis(4-hydroxyphenyl)-1-phenylpropane; 2,6-dihydroxynaphthalene; hydroquinone; resorcinol; $C_{1-3}$ alkyl-substituted resorcinols. For reasons of availability and particular suitability the preferred dihydric phenol is in some embodiments bisphenol A in which the radical of formula (III) is the 2,2-bis(4-phenylene)propane radical and in which Y is isopropylidene and $A^3$ and $A^4$ are each p-phenylene.

The substituted aromatic compounds of formula (I) which are employed in the present invention contain an aromatic radical $A^1$ and an activating radical Z. The $A^1$ radical is normally a di- or polyvalent $C_{6-10}$ radical, which in various embodiments may be monocyclic and free from electron-withdrawing substituents other than Z.

Unsubstituted $C_6$ aromatic radicals may be employed for the $A^1$ radical.

The radical Z is one which activates a leaving group X on an aromatic radical for displacement by alkali metal salts of dihydroxy-substituted aromatic hydrocarbons.

The Z radical is usually an electron-withdrawing group, which may be di- or polyvalent to correspond with the valence of $A^1$. Illustrative examples of divalent radicals include carbonyl, carbonylbis(arylene), sulfone, bis(arylene) sulfone, benzo-1,2-diazine and azoxy. Illustrative examples of the moiety —$A^1$—Z—$A^1$— include bis(arylene) sulfone, bis(arylene) ketone, tris(arylene)bis(sulfone), tris(arylene) bis(ketone), bis(arylene)benzo-1,2-diazine or bis(arylene) azoxy radical and especially those in which $A^1$ is p-phenylene.

Also included are compounds in which —$A^1$—Z—$A^1$— is a bisimide radical, illustrated by those of the formula (VII):

wherein $R^8$ is a substituted or unsubstituted $C_{6-20}$ divalent aromatic hydrocarbon radical, a $C_{2-22}$ alkylene or cycloalkylene radical, or a $C_{2-8}$ bis(alkylene-terminated) polydiorganosiloxane radical.

In one embodiment of the invention $R^8$ is derived from a diamine selected from the group consisting of aliphatic, aromatic, and heterocyclic diamines. Exemplary aliphatic moieties include, but are not limited to, straight-chain-, branched-, and cycloalkyl radicals, and their substituted derivatives. Straight-chain and branched alkyl radicals are typically those containing from 2 to 22 carbon atoms, and include as illustrative non-limiting examples ethyl, propyl, butyl, neopentyl, hexyl, dodecyl. Cycloalkyl radicals are typically those containing from 3 to 12 ring carbon atoms. Some illustrative non-limiting examples of cycloalkyl radicals include cyclobutyl, cyclopentyl, cyclohexyl, methyl cyclohexyl, and cycloheptyl.

In various embodiments the two amino groups in diamine-derived aliphatic moieties are separated from each other by at least two and sometimes by at least three carbon atoms. In particular embodiments for diamines, the two amino groups are in the alpha, omega positions of a straight-chain or branched alkyl radical, or their substituted derivatives; or in the 1,4-positions of a cycloalkyl radical or its substituted derivatives. In various embodiments substituents for said aliphatic moieties include one or more halogen groups, such as fluoro, chloro, or bromo, or mixtures thereof; or one or more aryl groups, such as phenyl groups, alkyl- or halogen-substituted phenyl groups, or mixtures thereof. In some embodiments substituents for aliphatic moieties, when present, are chloro or unsubstituted phenyl.

Aromatic moieties suitable for $R^8$ in formula (VII) include, but are not limited to, monocyclic, polycyclic and fused aromatic compounds having in some embodiments from 6 to 20, and in other embodiments from 6 to 18 ring carbon atoms, and their substituted derivatives. Polycyclic aromatic moieties may be directly linked by a covalent bond (such as, for example, biphenyl) or may be separated by 1 or 2 atoms comprising linking moieties as in formula (VIII)

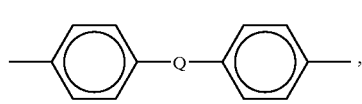

(VIII)

in which Q is

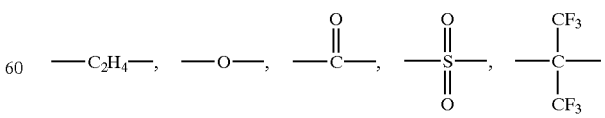

or a covalent bond. Representative linking moieties may also include phosphoryl, S, and $C_{1-6}$ aliphatic, such as isopropylidene and methylene. Illustrative non-limiting examples of aromatic moieties include phenyl, biphenyl, naphthyl, bis(pheny)methane, bis(phenyl)-2,2-propane, and their substituted derivatives. In particular embodiments substituents include one or more halogen groups, such as fluoro, chloro, or bromo, or mixtures thereof; or one or more straight-chain-, branched-, or cycloalkyl groups having from 1 to 22 carbon atoms, such as methyl, ethyl, propyl, isopropyl, tert-butyl, or mixtures thereof. In particular embodiments substituents for aromatic moieties, when present, are at least one of chloro, methyl, ethyl or mixtures thereof.

In various embodiments the two amino groups in diamine-derived aromatic moieties are separated by at least two and sometimes by at least three ring carbon atoms. When the amino group or groups are located in different aromatic rings of a polycyclic aromatic moiety, they are often separated from the direct linkage or from the linking moiety between any two aromatic rings by at least two and sometimes by at least three ring carbon atoms. In some embodiments diamines for the present invention include meta-phenylenediamine; para-phenylenediamine; mixtures of meta- and para-phenylenediamine; isomeric 2-methyl- and 5-methyl-4,6-diethyl-1,3-phenylenediamines or their mixtures; bis(4-diaminophenyl)-2,2-propane; and bis(2-chloro4-amino-3,5-diethylphenyl)methane.

Heterocyclic moieties suitable for $R^8$ in formula (VII) include, but are not limited to, monocyclic, polycyclic and fused heterocyclic compounds having in some embodiments from 3 to 30, in other embodiments from 5 to 13 ring carbon atoms, and 1 to 4 ring heteroatoms. The ring heteroatoms include, but are not limited to, oxygen, nitrogen, sulfur, or combinations thereof. In some embodiments ring heteroatoms are nitrogen. Polycyclic heterocyclic moieties may be directly linked by a covalent bond (such as, for example, bipyridyl) or may be separated by 1 or 2 atoms comprising linking moieties. Representative linking moieties include, but are not limited to, carbonyl, phosphoryl, O, S, $SO_2$, $C_{1-6}$ aliphatic, such as isopropylidene and methylene.

In various embodiments the two amino groups in diamine-derived heterocyclic moieties are separated by at least two and sometimes by at least three ring atoms. When the amino group or groups are located in different heterocyclic rings of a polycyclic heterocyclic moiety, they are separated from the direct linkage or from the linking moiety between any two heterocyclic rings by at least two and sometimes by at least three ring atoms. Exemplary heterocyclic moieties include, but are not limited to, furyl, pyridyl, bipyridyl, pyrryl, pyrazinyl, pyrimidyl, pyrazolyl, thiazyl, thienyl, bithienyl, and quinolyl.

Most often, $R^8$ is at least one of m-phenylene, p-phenylene, 4,4'-oxybis(phenylene) or

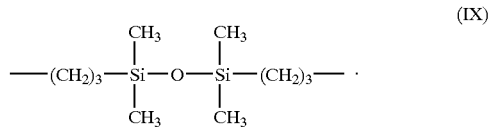

(IX)

Polyvalent Z radicals include those in which Z together with $A^1$ form part of a fused ring system such as benzimidazole, benzoxazole, quinoxaline or benzofuran.

Also present in the substituted aromatic compound of formula (I) are two displaceable $X^1$ radicals which may be fluoro, chloro, bromo, or nitro. In most instances, fluoro and especially chloro atoms are employed by reason of the relative availability and effectiveness of the compounds containing them. The relative positions of the two $X^1$ radicals on two aromatic rings are such that they are activated for displacement by alkali metal salts of dihydroxy-substituted aromatic hydrocarbons. The two $X^1$ radicals are often each in the para position or each in the meta position or one substituent is in the para position and one in the meta position relative to the an activating group Z on an aromatic ring (or relative to a second aromatic group attached to an activating group Z on an aromatic ring).

In various embodiments substituted aromatic compounds of formula (I) include but are not limited to bis(4-fluorophenyl)sulfone and the corresponding chloro compound; bis(4-fluorophenyl)ketone and the corresponding chloro compound; and 1,3- and 1,4-bis[N-(4-fluorophthalimido)]benzene, and 1,3- and 1,4-bis[N-(3-fluorophthalimido)]benzene; and 4,4'-bis[N-(4-fluorophthalimido)]phenyl ether, and 4,4'-bis[N-(3-fluorophthalimido)]phenyl ether; and the corresponding chloro and bromo compounds, especially at least one of 1,3-bis[N-(4-chlorophthalimido)]benzene, 1,4-bis[N-(4-chlorophthalimido)]benzene, 1,3-bis[N-(3-chlorophthalimido)]benzene, 1,4-bis[N-(3-chlorophthalimido)]benzene, 1-[N-(4-chlorophthalimido)]-3-[N-(3-chlorophthalimido)benzene, or 1-[N-(4-chlorophthalimido)]-4-[N-(3-chlorophthalimido)benzene.

Also present in the polymer-containing mixture is at least one phase transfer catalyst, which in various embodiments is substantially stable at the temperatures employed; i.e., in the range of about 125–250° C. Various types of phase transfer catalysts may be employed for this purpose. They include quaternary phosphonium salts of the type disclosed in U.S. Pat. No. 4,273,712, N-alkyl-4-dialkylaminopyridinium salts of the type disclosed in U.S. Pat. Nos. 4,460,778 and 4,595,760, and guanidinium salts of the type disclosed in the aforementioned U.S. Pat. No. 5,229,482. In some embodiments the phase transfer catalysts, by reason of their exceptional stability at high temperatures and their effectiveness to produce high molecular weight aromatic polyether polymers in high yield, comprise the hexaalkylguanidinium and alpha,omega-bis(pentaalkylguanidinium)alkane salts, particularly the chloride salts. In a particular embodiment the catalyst is 1,6-bis(penta-n-butylguanidinium)hexane dibromide. In another particular embodiment the catalyst is hexaethylguanidinium chloride.

At least one substantially water-immiscible organic solvent may also be present in the polymer-containing mixture. Said at least one solvent may completely or at least partially dissolve reaction ingredients. Within the context of the present invention suitable solvents are those which have a boiling point at atmospheric pressure of in one embodiment greater than 110° C. (and in another embodiment greater than about 125° C.) and a density which is in one embodiment in a ratio of greater than 1.1:1, in another embodiment greater than 1.15:1, and in still another embodiment greater than 1.2:1 compared to the density of water at 20–25° C. (which is 0.997 grams per cubic centimeter). Substantially water-immiscible means that the organic solvent dissolves to the extent of in one embodiment less than about 10 wt. % and in another embodiment less than 5 wt. % in water, or that water dissolves to the extent of in one embodiment less than about 10 wt. % and in another embodiment less than about 5 wt. % in the organic solvent. In some embodiments solvents are aromatic hydrocarbons, and particularly halogenated aromatic hydrocarbons. In particular embodiments solvents include diphenylsulfone, chlorinated benzenes, such as chlorobenzene, dichlorotoluene, 1,2,4-trichlorobenzene, and especially o-dichlorobenzene (hereinafter often referred to as ODCB). Mixtures of such solvents may also be employed.

In one embodiment the method of the present invention comprises contacting a polyether-containing organic phase with water and separating a water-containing phase from the organic phase. In some embodiments contacting with and separating a water-containing phase from the organic phase is essentially a liquid/liquid process which includes the process of extraction of liquid organic phase with water. In other embodiments contacting with and separating a water-containing phase from the organic phase is a solid/liquid process wherein the water-containing phase comprises a solid phase that c an be separated by a solid separation method as described hereinbelow. Such methods may be performed in a batch, semi-continuous, or continuous mode.

In various embodiments contaminating species may be transferred from the organic to the aqueous phase during contact with water. Contact with and separation from water typically comprises at least three secondary processes: creation of sufficient surface area between water and organic phases for optimum contact while minimizing emulsion formation; transfer of water-soluble species from organic to water phases; and separation of water and organic phases. Typical water-soluble species which may be transferred include alkali metal halide and other alkali metal salts, ionic catalyst species and catalyst decomposition products, and residual monomer species. Contact with and separation from water may be performed using known methods and apparatus, including known methods for liquid-liquid contacting. In some embodiments contact with water is performed using a counter-current contact method with fresh water first contacting organic phase containing the lowest concentrations of water-soluble species (such as sodium chloride and ionic catalyst species). Any known method for performing counter-current extraction of a heavier-than-water organic phase with water may be used. Contact with and separation from water methods also include those which employ, either separately or in series, one or more of mixer/settling vessels such as mixing/settling tanks, in-pipe static mixers, liquid droplet coalescers, extraction columns, liquid-liquid extractors, counter-current contact apparatus, homogenizers, and liquid-liquid centrifuges, or combinations thereof. Temperatures at which such processes may be performed refer to the entire process and particularly to the secondary process of separation.

In some embodiments prior to any purification step which involves contact with and separation from water, a polyether-containing reaction mixture is quenched with acid. Quenching with acid may be performed either before or after any solid separation step, such as filtration, that may be employed. The acid can be in solid, liquid, gaseous, or solution form. Suitable acids include organic acids such as acetic acid, and inorganic acids such as phosphorous acid, phosphoric acid, or anhydrous hydrochloric acid. A gaseous acid, such as anhydrous hydrochloric acid, can be bubbled into the reaction mixture through a sparger or delivered as a solution in a convenient solvent such in the same organic solvent as used in the reaction mixture. The quantity of acid added is in various embodiments at least sufficient to react with the calculated amount of phenoxide end-groups that will be present for a given molecular weight of polyether product. In other embodiments the quantity of acid added is greater than the calculated amount and in still other embodiments about twice the calculated amount of phenoxide end-groups that will be present for a given molecular weight of polyether product.

The acid may be added using any convenient protocol. Typically, a gaseous acid is added over time, said time being dependent upon factors known to those skilled in the art, including the volume of the reaction mixture and the concentration of polyether product among other factors. The time of addition is typically less than about 60 minutes, more typically less than about 20 minutes, and still more typically less than about 10 minutes. The temperature of the reaction mixture during acid addition may vary from about room temperature to a temperature above the boiling point of the organic solvent (in which latter case the mixture is under pressure), and more typically from about room temperature to about the boiling point of the organic solvent, in some embodiments from about 50° C. to about 210° C., in other embodiments from about 60° C. to about 180° C. and in still other embodiments from about 90° C. to about 140° C. Following acid quenching, the polymer-containing mixture may be taken directly to any subsequent steps or may be stirred for a convenient period, which in some embodiments may be about 30–60 minutes.

The quenching step typically converts surface-active species, for example phenoxide salts of alkali metal and/or catalyst cationic species, to non-surface-active phenolic groups. This quenching step also permits more efficient recovery of any polymer-bound catalyst cationic species by converting them to salts which are more easily recovered from the polymer-containing mixture, such as chloride salts. In the case of polyetherimide-containing reaction mixtures quenching is also important in converting any residual carboxylate salts to carboxylic acids which can ring-close to imide during subsequent processing steps resulting in higher polymer stability. The quenching step also helps deter emulsion formation during subsequent water extraction through removal of surface active species.

In one embodiment the method of the present invention comprises subjecting the polyether-containing mixture to at least one extraction with water following acid quenching. Water extraction may be performed using a mixer and settling tank combination. An advantage of this combination is that the required equipment is simple, requiring an impeller or other dynamic mixing device, and a tank of proper geometry.

In a particular embodiment a mixer/settling tank is filled with a polyetherimide/o-dichlorobenzene solution comprising sodium chloride and at least one catalyst, such as a hexaalkylguanidinium chloride. The polymer-containing mixture is brought to a temperature in one embodiment in the range of about 25–205° C., in another embodiment in the range of about 60–180° C., in another embodiment in the range of about 70–120° C., and in still another embodiment in the range of about 85–105° C. Water is added to the tank and stirring is applied. The temperature is maintained in the ranges mentioned above. If desired, water may be preheated before addition to the organic phase, or a water-organic mixture may be reheated to a desired temperature range. When temperatures above the effective boiling point (at atmospheric pressure) of the mixture are employed, then the tank is typically enclosed under pressure during any water addition and extraction step. In these cases typical pressures are about 1 to about 280 psi.

Brine formation is desirably achieved under conditions which minimize the amount of water used and which favor rapid phase separation of aqueous and organic phases. Typical phase ratios are in some embodiments about 0.5–6 parts of organic phase to one part water by weight. In a particular embodiment the phase ratio is about 5 parts of organic phase to one part water by weight. The desired stirring rate is below the rate at which emulsification of the mixture occurs. More particularly, the stirring rate must provide sufficient contact between the phases so that adequate mass transfer occurs without too large an interfacial area being generated. Typical stirring rates are such as to provide Reynolds numbers of in some embodiments about 25–500 and in other embodiments about 50–100.

In one embodiment the stirrer is stopped after a few minutes of stirring and the ODCB/water mixture is allowed to settle. The ODCB layer is typically the bottom layer. Some of the sodium chloride dissolves in the water and some remains in the ODCB phase, typically as crystals. This first extraction typically achieves up to about 70–99.9% sodium chloride removal from an ODCB phase, and more typically about 90–99.9%. The first extraction also typically removes about 50–99.9% of any ionic catalyst present. In particular embodiments the first extraction achieves greater than 99.9% removal of sodium chloride and of ionic catalyst.

In some embodiments the aqueous phase is separated without including any emulsified material or emulsified layer (hereinafter sometimes referred to as "rag layer") that may be present, and saved for catalyst, monomer species, and sodium chloride recovery by conventional means (for instance, using a coalescer). The formation of rag layer may be affected by such variables as the ratio of aqueous phase to organic phase, the time and intensity of stirring, the concentration of alkali metal halide, the concentration of polymer, the concentration of unquenched polymer endgroups, and the temperature among other factors. Any rag layer, if present, may be separated and transferred to a separate vessel for later addition to the next batch of polymer mixture for purification, or left together with the organic phase for a second extraction. The organic phase remaining may be subjected to a second extraction or other purification step, if further purification is desired, or sent to a polymer isolation step where the solvent is completely removed from the solution.

In another embodiment the organic phase after any extraction with water is heated before any subsequent contact with and separation from water. The temperature to which the organic phase is heated is in some embodiments higher than that temperature of the organic phase at which a previous extraction was performed. The temperature to which the organic phase is heated is in other embodiments higher than that temperature at which any subsequent extraction is performed. The temperature to which and time for which the organic phase is heated is in still other embodiments a temperature and time sufficient to render the organic phase substantially transparent and in still other embodiments a temperature and time sufficient to substantially break any emulsion that may be present such that either the organic phase becomes substantially homogeneous or any residual water separates from the organic phase, or both. The temperature is in one embodiment in a range between about 60° C. and the boiling point of the organic phase under the prevailing conditions, in another embodiment in a range between about 90° C. and about 180° C., in still another embodiment in a range between about 100° C. and about 160° C., in still another embodiment in a range between about 110° C. and about 150° C., and in still another embodiment in a range between about 120° C. and about 150° C. Following heating of the organic phase to a temperature in the desired range, the temperature is typically lowered to a temperature in a range for a subsequent extraction with water.

If higher levels of purification are desired, one or more additional water contact and separation steps may be performed, for example in one embodiment using mixing/settling, for example in the same vessel. A ratio of in one embodiment about 0.5–6:1 (weight/weight) organic phase to water and in another embodiment 5:1 (weight/weight) organic phase to water is used. Mixing includes stirring. The desired stirring rate is below the rate at which emulsification of the polymer-containing mixture occurs. More particularly, the stirring rate must provide sufficient contact between the phases so that adequate mass transfer occurs without too large an interfacial area being generated. Typical stirring rates are such as to provide Reynolds numbers of in some embodiments about 25–500 and in other embodiments about 50–100.

In addition, any extraction after a first extraction is performed in some embodiments in the temperature range of about 25–205° C., in other embodiments in the range of about 60–180° C., and in still other embodiments in the range of about 80–100° C. A second water extraction process typically achieves in some embodiments up to about 90–99.9% and in other embodiments greater than about 99.9% residual sodium chloride and ionic catalyst removal from an organic phase (based on the weight sodium chloride and catalyst remaining after a first extraction).

In another embodiment a second (or subsequent) water extraction step can be carried out by a process which comprises sparging steam through the organic phase under pressure. The steam temperature has a value of less than the boiling point of organic phase under the process conditions, and in some embodiments is a temperature of about 110–175° C., and in other embodiments a temperature of about 140° C. The organic mixture has in some embodiments a temperature of about 25–175° C., and in other embodiments a temperature of about 110° C. The amount of steam sparged per minute is typically such as to provide a volume/volume ratio of organic phase to steam in some embodiments in a range of between about 0.5:1 and about 10:1; in other embodiments in a range of between about 1:1 and about 7:1 and in other embodiments in a range of between about 2:1 and about 5:1. In a typical process steam is sparged in some embodiments for about 1–60 minutes; in other embodiments for about 10–60 minutes and in other embodiments for about 30 minutes. Steam may be vented from the container through a pressure relief valve. Any organic phase that happens to be removed along with the escaping steam may be recovered using standard methods.

As the steam rises, it will typically carry upwards any residual entrained water droplets remaining from a first (or subsequent) extraction, thus further increasing the sodium recovery efficiency. As described above, the aqueous phase may typically collect at the top of the organic phase. The organic phase may then be removed from the bottom of the vessel leaving the aqueous phase behind after which said aqueous phase may be treated in a manner as described hereinafter. More than one step comprising steam sparging of an organic phase may be employed.

In another embodiment a static mixer can be used in conjunction with or as an alternate approach to a dynamic mixer/settling tank in a purification process comprising water extraction. The advantages of static mixers are that a milder degree of mixing is often possible by minimizing shear forces and avoiding smaller droplet formation and possible emulsification. Various process configurations can be employed when at least one step in the process uses a static mixer. For example, a static mixer can be used for a first extraction with water, or for all extractions with water, or for one or more subsequent extractions with water following a first extraction that employs a dynamic mixer/settling tank combination.

The usefulness of a static mixer may be greater for performing a second or subsequent extraction following a first water extraction, since often with second and/or subsequent extractions the emulsification tendencies may be greater. Employing a static mixer for at least one extraction step may be particularly useful when a polymer mixture produces a larger than usual rag layer or emulsifies abnormally, or when the purification process comprises adding rag layer either to a subsequent extraction after a first extraction or to a next polymer mixture, and the volume of rag layer continues to increase as the number of batches increases. Since in many embodiments rag layers represent about 10% (by volume) or less of any aqueous phase volume (or less than about 2% (by volume) of the organic phase), the use of additional water injected into any rag layer as it is removed from a holding tank, for example, for pumping through a static mixer is not a serious penalty to the process operation. The two phases can then be separated and recovered by such means as in a coalescer filter medium. A static mixer/coalescer combination can also be used in parallel to the hereinabove described processes of one or more water extraction steps (including the steam sparging option), optionally with a subsequent filtration step. In one embodiment a dynamic mixer/settling tank combination may separate the bulk of the two phases while a static mixer/coalescer reclaim the polymer solution from any rag layer formed. In another embodiment a dynamic mixer/settling tank combination may separate the bulk of the two phases and the organic phase (optionally with rag layer) may then be passed at least once through a recycle loop comprising a static mixer with water injection at a level of about 0.5–7:1 organic: water (weight/weight). The treated polymer-containing mixture may then return to a tank for settling or other treatment as described hereinabove. An advantage of such processes is that a static mixer can be used to perform the mixing in a transfer pipe in a matter of seconds, rather than minutes as in a mixer tank, and a liquid-liquid coalescer filter can be used in parallel with or instead of a settling tank to perform the separation of organic from water.

In a particular embodiment a polyetherimide-containing ODCB solution may be pumped out of a holding tank to a static mixer, where it may be combined with a stream of water in a predetermined ratio and put through a static mixer. The amount of water added may be in one embodiment about 0.5–7:1 and in another embodiment about 5:1 ODCB-:water (weight/weight ratio). The speed of pumping is determined by the desired Reynolds number in the static mixer. Reynolds numbers less than 500 will typically result in mild interphase contact approaching laminar flow as the Reynolds number goes to zero. More vigorous contacting will be obtained in turbulent flow above 2000 Reynolds Number. By adjusting the length of the static mixer the contact time between the two phases can be controlled. The contact time is typically on the order of seconds. Because of the action of the static mixer resembles end-over-end or side-by-side motion rather than a shearing motion as in a stirrer, emulsification is inhibited.

In a particular embodiment contact between ODCB phase and water phase in a static mixer is performed at temperatures of about 25–175°. Typical pressures are about 1–280 psi. The mixed system may then be sent directly to a coalescer, particularly if the time for phase separation in a settling tank is longer than desired. The coalescer may be operated at a temperature similar to or different from that of the polymer-containing mixture to be separated. The use of a coalescer may require a to temperature as high as possible (for example, as high as about 90° C.) to reduce viscosity, and an ODCB-to-water ratio of less than 1:1, for instance, since coalescers are typically only effective for oil-in-water emulsions. A prefilter may be required to remove solid particles, for example of residual monomer, prior to using a coalescer. Alternatively, a settling tank can be used instead of a coalescer. In the settling tank, the aqueous phase is continuously decanted at the top, the organic phase is continuously sent to polymer isolation where the ODCB may be evaporated from the polymer.

In still another embodiment contact of polyether-containing organic phase with water may be performed in a liquid-liquid extraction column, whereby sodium chloride and other water soluble species are extracted into the water phase from the organic phase. Typically operation of such a column comprises contact between two immiscible liquids in counter-current manner, for example, with the less dense phase moving upward and the more dense phase moving downward. The column is typically filled with a packing to increase surface area, such as balls, rings, saddles, or other material known in the art. Other methods for improving column efficiency comprise inclusion in the column of perforated plates attached to a central rod which may be oscillated, or inclusion in the column of alternating sections of mixing zones and decanting zones. Operation of a liquid-liquid extraction column in the present context is at a temperature in a range in one embodiment between about 60° C. and about 150° C., in another embodiment between about 70° C. and about 120° C., and in still another embodiment between about 80° C. and about 100° C. Optionally the extraction column may be operated under pressure. Feed ratios are in some embodiments in a range of about 5:1 (wt./wt.) to 1:5 (wt./wt.) organic phase to aqueous phase, and in other embodiments in a range of about 3:1 (wt./wt.) to 1:3 (wt./wt.) organic phase to aqueous phase.

The aqueous phase from any extraction step by any method may be removed and sent for recycling, waste water treatment, and/or to at least one recovery step (for example, processing in a coalescer) for recovery of such species as catalyst and traces of organic solvent. In one embodiment two or more aqueous fractions from different extractions are combined for recovery of such species as catalyst, monomer, and any traces of organic solvent. Any small, water-insoluble particles that may remain in the organic phase after separation from a water phase may be removed by a solid separation step as described hereinafter.

In a particular embodiment hexaalkylguanidinium chloride catalyst from a polyetherimide preparation may be recovered for reuse from one or more aqueous fractions by mixing with ODCB and removing water by distillation until substantially all the water is removed. The distillation may be further continued until a desired concentration of catalyst in ODCB and a desired residual water level are obtained. If necessary, additional ODCB may be added to the distillation residue as required. The amount of recovered catalyst in ODCB is typically an amount in a range of between about 5% and about 99%, more typically in a range of between about 40% and about 98%, and still more typically in a range of between about 50% and about 90% of the original amount of catalyst added to a reaction mixture. Concentrations of residual water are in some embodiments less than 100 ppm, and in other embodiments less than 50 ppm. If there are any water-insoluble particles in the catalyst-containing ODCB phase after distillation, they may be removed by filtration as described hereinafter.

The purification methods of the present invention may comprise one or more solid separation steps, such as, but not limited to, filtration, sedimentation and decantation, or solid/liquid centrifugation. Such a process may be performed in a batch, semi-continuous, or continuous mode. Any known filtration method may be used. For example, filtration may be performed using at least one of a dead-end filter, cross-flow filter, liquid-solid cyclone separator, vacuum drum filter, centrifuge, or vacuum conveyor belt separator. In particular, suitable filtration methods include those described in "Chemical Engineer's Handbook", (Robert H. Perry and Cecil H. Chilton, editors; McGraw Hill, publishers). In one embodiment a purification process may comprise at least one dry filtration step (that is, a filtration of a polyether-containing organic phase substantially free of water) as described hereinafter. Any solid separation step may be performed at a temperature in one embodiment in a range of between about room temperature and about the boiling point of the organic phase under the prevailing conditions, in other embodiments in a range of between about 25° C. and about 220° C., in other embodiments in a range of between about 25° C. and about 180° C., in other embodiments in a range of between about 60° C. and about 180° C., in other embodiments in a range of between about 80° C. and about 160° C., in other embodiments in a range of between about 80° C. and about 140° C., in other embodiments in a range of between about 85° C. and about 120° C., in other embodiments in a range of between about 85° C. and about 110° C., and in other embodiments in a range of between about 90° C. and about 105° C. One effect of using elevated temperature is to decrease the mixture viscosity to facilitate processes such as filtration.

In another embodiment a purification process may comprise at least one solid separation step, such as filtration, which comprises providing a small amount of water to a polyether-containing organic phase and mixing the phases before solid separation. In one embodiment the polymer-containing solution is quenched with acid before addition of water. Typically water is provided at a temperature in some embodiments in the range of about 25–110° C., in other embodiments in the range of about 60–105° C., and in still other embodiments in the range of about 80–100° C. In one embodiment water may be supplied as steam. Water is added to the vessel holding polymer solution and mixing (such as stirring) is applied. If desired, water may be preheated before addition to the organic phase, or a water-organic mixture may be reheated to a desired temperature range. The amount of water added is in some embodiments in a range between about 0.005 wt. % and about 10 wt. %, in other embodiments in a range between about 0.01 wt. % and about 10 wt. %, in other embodiments in a range between about 0.05 wt. % and about 10 wt. %, in other embodiments in a range between about 0.05 wt. % and about 8 wt. %, in other embodiments in a range between about 0.1 wt. % and about 5 wt. %, in other embodiments in a range between about 0.3 wt. % and about 5 wt. %, in still other embodiments in a range between about 0.5 wt. % and about 5 wt. %, and in still other embodiments in a range between about 0.5 wt. % and about 1 wt. % based on weight of polyether in the organic solution. In certain other embodiments of the invention the amount of water added is in a range between about 0.3 wt. % and about 3 wt. % based on weight of polyether in the organic solution. Although the invention is not limited by any theory of operation, it is believed that the added water interacts upon contact with the hydrophilic alkali metal halide crystals (such as sodium chloride crystals) and forms liquid bridges that promote further agglomeration. The agglomerated crystals containing the water phase can then be separated using any known solid separation method, in some embodiments by solid/liquid centrifugation or filtration or decantation. In a particular embodiment a polyetherimide-containing ODCB reaction mixture is treated with water, mixed, optionally allowed to settle, and filtered (or decanted) as described, and the permeate from said filtration can then be subjected to further purification steps, if so desired, including, for example, extraction one or more times with water as described above. In some embodiments substantially all or at least a portion of alkali metal halide may be removed before any extraction of the polyether-containing organic solution with water.

In another embodiment a purification process may comprise at least one solid separation step which comprises providing a small amount of water to a polyether-containing organic phase and then heating the mixture to a temperature of at least the boiling point of water under the process conditions and subsequently separating solid such as by filtering. In various embodiments water may be supplied as liquid, optionally preheated, or as steam. Water may also be provided as residual water remaining with organic phase after at least one water extraction of the organic phase. Water may also be provided in quenching the reaction mixture with acid. The amount of water added is in some embodiments in a range between about 0.005 wt. % and about 10 wt. %, in other embodiments in a range between about 0.01 wt. % and about 10 wt. %, in other embodiments in a range between about 0.05 wt. % and about 10 wt. %, in other embodiments in a range between about 0.05 wt. % and about 8 wt. %, in other embodiments in a range between about 0.1 wt. % and about 5 wt. %, in other embodiments in a range between about 0.3 wt. % and about 5 wt. %, in still other embodiments in a range between about 0.5 wt. % and about 5 wt. %, and in still other embodiments in a range between about 0.5 wt. % and about 1 wt. % based on weight of polyether in the organic solution. In certain other embodiments of the invention the amount of water added is in a range between about 0.3 wt. % and about 3 wt. % based on weight of polyether in the organic solution. The temperature of the organic phase in contact with water may be raised to a temperature in some embodiments between the boiling point of water and the boiling point of the organic phase under the prevailing pressure, in other embodiments to at least about 100° C., in still other embodiments to a temperature between about 110° C. and the boiling point of the organic phase and in still other embodiments to a temperature between about 120° C. and the boiling point of the organic phase under the process conditions. Alternatively, the polymer-containing mixture in contact with water can be heated under partial vacuum, in which case the temperature may also be less than 100° C. as well as in the ranges given above. Under these conditions water generates small bubbles of steam that escape the organic phase and evaporate. Any organic solvent that escapes with the steam may be recovered using conventional means. Although the invention is not limited by any theory of operation, it is believed that in the process of water evaporation species dissolved in the aqueous phase recrystallize, grow in size, and form agglomerates so that they may sediment to the bottom of the tank when stirring is stopped. Typically any alkali metal halide recrystallizes during evaporation of water to form agglomerates. Said agglomerates are typically larger in size than any crystallites or agglomerates that may be present before an evaporation step. Essentially all or at least a portion of alkali metal halide is now typically in a form that can be separated (such as by filtration or decantation) following application of heat. The polyether-containing mixture is typically held at a temperature in the desired range until at least some of or most of or essentially all of the water has evaporated, or in some embodiments until essentially all or at least a portion of alkali metal halide is in a form that can be separated. The mixture may now be subjected to a solid separation step such as filtration or decantation. An organic permeate from filtration may be subjected to further purification steps and/or sent to equipment for recovery of polymer. A filter cake itself may be treated to recover any entrained polymer and other valuable species by standard techniques, such as by extracting with organic solvent.

In a particular embodiment a polymer mixture comprises (i) an aromatic polyetherimide, (ii) hexaethylguanidinium chloride catalyst, (iii) sodium chloride, and (iv) o-dichlorobenzene. Water is provided in the prescribed amounts and the temperature of the ODCB phase is raised to a temperature in some embodiments between the boiling point of water and the boiling point of ODCB under the prevailing pressure, in other embodiments to at least 110° C., in still other embodiments to a temperature between about 110° C. and the boiling point of ODCB under the process conditions and in still other embodiments to a temperature between about 120° C. and the boiling point of ODCB under the process conditions (wherein the normal boiling point of ODCB is 180° C. at one atmosphere pressure). Alternatively, the polymer-containing mixture can be heated under partial vacuum, in which case the temperature may also be less than 110° C. as well as in the ranges given above. Any ODCB that escapes with the steam may be recovered using conventional means. In the process of water evaporation sodium chloride dissolved in the aqueous phase may recrystallize, and the crystallites grow in size, and form agglomerates so that they may sediment to the bottom of the tank when stirring is stopped. For instance, the initial size of sodium chloride crystals produced during a typical polyetherimide polymerization may typically be in the range of about 0.5 to about 20 μm in diameter in an ODCB phase. The agglomerates are typically larger in size than any crystallites or agglomerates that may be present before an evaporation step. A portion of residual sodium chloride is now typically in a form that can be filtered. The polymer mixture is filtered using known methods. The ODCB permeate from filtration may be subjected to further purification steps and/or sent to equipment for recovery of polyetherimide from organic solvent. The filter cake itself may be treated to recover any entrained polyetherimide and other valuable species by standard techniques, such as by extracting with ODCB.

Water may be provided to a polyether-containing mixture by any convenient method. In one embodiment at least one filtration step may be included following one or more water extraction steps in which case water is provided as residual water remaining after extraction. Additional water may be added if desired. This embodiment may be employed, for example, in embodiments for polyether-containing mixtures in which the initial particle size of solids present in the organic phase may be such that filtration prior to extraction is not feasible or cost effective. The combination of one or more water extraction steps followed by a filtration step may be used to treat polyether/organic solvent mixture, or rag layers therefrom, or the combination of polyether/organic solvent mixture and rag layer. Thus, in a particular embodiment a polyetherimide/ODCB reaction mixture comprising sodium chloride, residual monomer, and catalyst is subjected to one or more water extraction steps to remove the bulk of water-soluble species, and then subjected to at least one filtration step comprising heating the reaction mixture as described.

In other embodiments a polyether-containing solution may be treated with water to effect agglomeration of alkali metal halide as described. Following removal of solid alkali metal halide by a suitable solid separation step, the polyether-containing solution may be extracted with water as previously described to effect removal of remaining water-soluble species such as ionic catalysts and catalyst decomposition products. A distribution coefficient ($K_d$) of catalyst between water and organic phases (as represented by the ratio of the concentration of catalyst in the aqueous phase to the concentration of catalyst in the organic phase) is in some embodiments at least 1, and in other embodiments in a range of between about 1 and about 60. The distribution coefficient may be affected by such variables as the ratio of aqueous phase to organic phase, the time and intensity of stirring, the concentration of alkali metal halide, and the temperature among other factors. Recovery of water-soluble species such as catalyst species may be effected using known methods such as by removing water by distillation in the presence of organic solvent until substantially all the water is removed. The distillation may be further continued until a desired concentration of catalyst in organic solvent and a desired residual water level are obtained. If necessary, additional organic solvent may be added to the distillation residue as required.

In another embodiment the method of the present invention comprises initial treatment of a polyether-containing mixture by at least one non-aqueous or dry filtration step, in which contaminating species are removed as solid particles or adsorbed species in the substantial absence of water. Substantial absence of water in the present context means that the organic solution contains in some embodiments less than about 1%, in other embodiments less than about 0.5%, in still other embodiments less than about 0.2%, in still other embodiments less than about 0.1%, and in still other embodiments less than about 0.01% by weight water. In some embodiments dry filtration is performed before any step comprising treatment of the polymer-containing solution with water, so that only adventitious water may be present in the polymer-containing solution. Typical species which may be removed by dry filtration include alkali metal halide and residual monomer salts. Dry filtration may be performed using standard filtration methods, including those which employ one or more steps of mechanical filtration of solid particles, separation using liquid-solid cyclone separators, ion-exchange adsorption (for example, to recover catalyst), or vacuum conveyor belt separation.

In a particular embodiment polyetherimide-containing ODCB mixtures are treated by filtration to remove such filterable species as sodium chloride and bisphenol A monomer species as solid particles from the ODCB phase without initially adding water. Other insoluble species will also be removed from the ODCB phase. Following filtration, catalyst species and other non-filterable, water-soluble species may be separated and recovered via aqueous methods such as those employing a dynamic or static mixer or any of the aqueous configurations previously discussed. In one embodiment acid quenching is postponed until after filtration so that bisphenol A salts can be removed by filtration; otherwise, bisphenol A formed during quenching may become soluble in the organic phase and may not be efficiently removed by solids filtration. In another embodiment quenching may be done before filtration, for example if bisphenol A salts are not present. The permeate from the filtration step is typically a clean solution of polymer and catalyst in ODCB. The stream that is rejected by the filter is typically a concentrated slurry of sodium chloride, residual monomer species, and some catalyst in ODCB. The primary filter may be at least one of either a dead-end filter or a cross-flow filter. If a dead-end filter is used, a back-washing step is required to remove the solids from the filter. Since flux through a dead-end filter is indirectly proportional to viscosity, decreasing the solution viscosity will typically increase the flux by a proportionate factor. The viscosity is largely determined by temperature and polymer concentration. Therefore, increasing the temperature or decreasing the polymer concentration may typically result in increased flux through a filter. In particular embodiments a polyetherimide solution in ODCB at a concentration in a range of in one embodiment between about 5 wt. % and about 25 wt. %, and in another embodiment in a range of between about 10 wt. % and about 15 wt. %, may be conveniently filtered at a temperature up to about the boiling point of ODCB, and in other particular embodiments at a temperature of about 90–180° C.

If a cross-flow filter is used, nearly continuous operation is possible but at least one secondary filter is typically required to minimize product loss. Process time and costs will determine which filtration method is best. If needed, the secondary filter can concentrate the slurry to a cake. The secondary filter may be a dead-end filter (such as a candle filter or a belt press) or a liquid cyclone. A liquid cyclone can perform the separation because the concentration of particles that occurs during cross-flow filtration induces solid particles to agglomerate and the inertial forces that promote separation in a liquid cyclone are often more effective for separation of larger agglomerates.

The permeate stream (from both the primary and, if necessary, the secondary filters) that is particle-free can be quenched with acid and sent for catalyst recovery. Because catalyst is typically more soluble in water than in ODCB, this stream can be processed with any of the aqueous methods described above. Similarly, catalyst can be processed via the dry method of ion exchange described hereinafter. Again, multiple combinations of aqueous and dry purification configurations are possible, depending on the relative process conditions and the desired level of purification.

In still another embodiment the method of the invention comprises at least one dry filtration step in the presence of a solid adsorption medium that may adsorb or absorb soluble species from a polyether-containing mixture. Insoluble species such as an alkali metal halide may be removed by simple physical filtration in the same process. The mechanism of adherence to a solid adsorption medium is not important provided that the medium serves to remove selected species in one or more filtration steps while passing essentially all polyether and any other species not selected. The adsorption medium may be contacted with the polymer-containing mixture either by addition of all or a portion of the medium to the mixture followed by stirring, in one embodiment in a range of between about room temperature and about the boiling point of the organic phase under the prevailing conditions, in other embodiments in a range of between about 25° C. and about 220° C., in other embodiments in a range of between about 25° C. and about 180° C., in other embodiments in a range of between about 60° C. and about 180° C., in other embodiments in a range of between about 80° C. and about 160° C., in other embodiments in a range of between about 80° C. and about 140° C., in other embodiments in a range of between about 85° C. and about 120° C., in other embodiments in a range of between about 85° C. and about 110° C., and in other embodiments in a range of between about 90° C. and about 105° C. In particular embodiments the adsorption medium may be contacted with the polymer-containing mixture either by addition of all or a portion of the medium to the mixture followed by stirring, at a temperature in one embodiment in a range of about 25–120° C., and in other embodiments in a range of about 60–105° C. In other embodiments the heated mixture can be filtered through all or a portion of adsorption medium not previously contacted with the mixture. In some embodiments the polymer-containing solution is quenched with acid before dry filtration.

Suitable adsorption media include, but are not limited to, alumina, silica, clay, montmorillonite, zeolite, charcoal, diatomaceous earth, fuller's earth, commercial filter agents such as CELITE, and other media typically employed in adsorption chromatography. In general higher surface area adsorbents (for example as represented by higher mesh numbers relating to smaller particle size) are more efficient in adsorbing the desired species. In a particular embodiment a polyetherimide reaction mixture in ODCB may be contacted with an appropriate adsorption medium to adsorb essentially all or a portion of soluble species (other than polyetherimide) such as ionic catalyst species, such as hexaethylguanidinium chloride. In a particular embodiment the adsorption medium is silica. The treated mixture can then be filtered one or more times to remove essentially all or a portion of insoluble alkali metal halide (such as sodium chloride) and adsorbed catalyst species on the medium. In alternative embodiments substantially all or at least a portion of alkali metal halide (such as sodium chloride) may be removed before treatment of the polymer-containing solution with a solid adsorption medium. In the present context substantially all the alkali metal halide means greater than about 90 wt. % alkali metal halide.

Following filtration (or other suitable solid separation step), catalyst species may be recovered from the solid medium using methods known in the art, and any non-polyether, soluble species, if still present in the filtrate, may be separated and recovered, for example by further filtration steps or by aqueous methods such as those employing a dynamic or static mixer or any of the aqueous configurations previously discussed. In some embodiments the adsorption medium may be regenerated for further use using known methods, for example by treatment with an organic acid such as acetic acid, or an inorganic acid such as hydrochloric acid, hydrobromic acid, phosphoric acid, or phosphorous acid.

In still another embodiment the method of the present invention comprises at least one dry filtration step followed by at least one ion exchange step for catalyst recovery. The dry filtration step may be accomplished by any combination of filtration methods described hereinabove. For the second step, ion exchange on a resin bed can be used after filtration to reclaim cationic catalyst remaining in the organic phase. Following ion exchange, the process solution may be sent for further purification and/or to an isolation step for polyether recovery by standard methods.

A purification process comprising any combination of at least one dry filtration step followed by at least one ion exchange step may be employed. In one embodiment the polyether-containing mixture is not quenched with acid before at least one dry filtration step and at least one ion exchange step. In this case the polymer-containing mixture following at least one filtration step may be contacted at least once with an ion exchange resin in the sodium form to remove ionic catalyst and release sodium chloride. In an alternative embodiment an unquenched polymer-containing mixture is contacted at least once with ion exchange resin in the hydrogen form and the resin itself serves entirely or at least partially as an acid quencher for the polymer-containing mixture, adsorbing ionic catalyst in the process. In another embodiment the polymer-containing mixture is quenched with acid after at least one dry filtration step. In this case the mixture following at least one filtration step and acid quenching may be contacted at least once with an ion exchange resin in the hydrogen form to remove ionic catalyst and release hydrogen chloride. In a particular embodiment a polyetherimide reaction mixture containing hexaalkylguanidinium chloride catalyst in ODCB, after at least one filtration step and acid quenching, is contacted at least once with an ion exchange resin in the sodium form.

A packed column of ion exchange resin can be used to exchange ionic catalyst for recovery. The identity of the ion exchange resin is not critical so long as the ion exchange resin is effective for recovering cationic catalyst for the polymer-containing mixture. AMBERLYST 36 or AMBERLYST 15 resins available from Rohm and Haas Co. can be used for this purpose. In a particular embodiment a polyetherimide-containing ODCB reaction mixture is passed through a resin bed operated below about 90° C. Depending on the mode of operation, the resin column will adsorb the catalyst cation and typically release sodium chloride or hydrochloric acid.

The ion exchange process may be performed in a batch, semi-continuous, or continuous mode. In one embodiment a column saturated with catalyst cation is regenerated off-line with hydrochloride acid and the catalyst chloride salt is recovered from the aqueous phase for reuse. While a saturated column is being regenerated, at least one fresh column may be in use for recovering catalyst cation from further process solution.

Following any of the purification procedures illustrated hereinabove, a polyether-containing organic solution may be sent to a polymer isolation step where the polyether may be isolated free of organic solvent by standard methods, such as by anti-solvent precipitation, filtration, and drying, or by devolatilization, for example, in an appropriate extruder with recovery and recycling of the organic solvent. In a particular embodiment a polyetherimide is isolated from an ODCB solution and the ODCB is recovered and recycled for further use. The isolated polyetherimide preferably contains as low a sodium level as possible, in one embodiment less than about 100 ppm sodium, in another embodiment less than about 50 ppm sodium, in still another embodiment less than about 25 ppm sodium, in still another embodiment less than about 10 ppm sodium, and in still another embodiment less than about 7 ppm. A particular polyetherimide comprises the reaction product of a bisphenol A moiety, particularly bisphenol A disodium salt, with at least one of 1,4- or 1,3-bis[N-(4-chlorophthalimido)]benzene.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner. The terms "extraction" and "wash" are used interchangeably.

EXAMPLE 1

A polyetherimide was prepared in o-dichlorobenzene through the reaction of bisphenol A disodium salt and 1,3-bis[N-4-chlorophthalimido]benzene in the presence of hexaethylguanidinium chloride catalyst (HEG). The polymer-containing mixture was quenched at 120° C. with glacial acetic acid and diluted to about 15% solids (wt. polymer/wt. polymer+wt. solvent) through addition of more o-dichlorobenzene. The mixture (about 10 liters; about 13 kilograms) was washed with about 4.1 kilograms water (3:1 organic:aqueous) at a temperature of about 85–90° C. and fed to a liquid/liquid continuous centrifuge at about 90° C. at different rates. All of the organic phase was collected and washed with a second portion of water (about 4.1 kilograms), and the organic phase fed to the centrifuge a second time. All of the organic phase was collected and washed with a third portion of water (about 4.1 kilograms), and the organic phase fed to the centrifuge a third time. For each set of conditions the organic phase was analyzed by ion chromatography for sodium, HEG and PEG (pentaethylguanidinium chloride, a decomposition product of HEG); duplicate analyses were run on the same sample. Conditions and analyses are summarized in Table 1. In each case the data are reported vs. polymer rather than vs. the entire mixture. The centrifuge employed had a maximum rating of 10,000 rpm.

TABLE 1

| Run No.* | Org. + Aq. Flow grams/ minute | Centri- fuge rpm | Sodium analyses, ppm vs. polymer | HEG analyses, ppm vs. polymer | PEG analyses, ppm vs. polymer |
|---|---|---|---|---|---|
| first pass | 1000 | 75% | 890/905 | 333/335 | 150/150 |
| first pass | 900 | 100% | 690/712 | 327/322 | 141/142 |
| first pass | 450 | 100% | 769/828 | 292/293 | 134/132 |
| first pass | 600 | 100% | 785/809 | 290/288 | 131/131 |
| second pass | 800 | 100% | 251/310 | 31/32 | 19/21 |
| second pass | 400 | 100% | 224/192 | 38/41 | 24/25 |
| third pass | 800 | 100% | 165/177 | 9/8 | 6/5 |

The data show that the sodium and catalyst level decreases with each successive wash. The sodium level may be further decreased using evaporation and filtration process steps.

EXAMPLE 2

The same quenched, diluted polyetherimide-containing mixture used in Example 1 (4 liters) was fed simultaneously along with water through a concentric tube assembly to a homogenizer at flow rates of 450 grams per minute for the organic phase and 150 grams per minute for the aqueous phase. Both the organic and aqueous phases were at a temperature of about 85–90° C. The homogenizer, comprising a rotor assembly with blades and a stator with outlet orifices on the periphery and an exit port leading to a centrifuge, was operated at different rpms. The homogenized mixture from the homogenizer was fed directly to a liquid/liquid centrifuge operated at 100% rpm capability. All of the organic phase was collected and fed to the homogenizer along with water under the same conditions as for the first pass, and the output fed to the centrifuge a second time. All of the organic phase was collected and fed to the homogenizer along with water under the same conditions as for the first pass, and the output fed to the centrifuge a third time. For each set of conditions the organic phase was analyzed by ion chromatography for sodium, HEG and PEG (pentaethylguanidinium chloride, a decomposition product of HEG); duplicate analyses were run on the same sample. Conditions and analyses are summarized in Table 2. In each case the data are reported vs. polymer rather than vs. the entire mixture.

TABLE 2

| Run No.* | Homo-genizer rpm | Sodium analyses, ppm vs. polymer | HEG analyses, ppm vs. polymer | PEG analyses, ppm vs. polymer |
|---|---|---|---|---|
| first pass | 1500 | 1592/1583 | 242/239 | 81/80 |
| first pass | 3000 | 2306/2320 | 261/261 | 100/99 |
| first pass | 4000 | 2010/1996 | 182/188 | 77/77 |
| second pass | 2000 | 670/682 | 15/15 | 9/9 |
| third pass | 1500 | 129/125 | 8/9 | 4/4 |

The data show that the sodium level decreases with each successive wash. The sodium level may be further decreased using evaporation and filtration process steps.

EXAMPLE 3

A similar polyetherimide-containing mixture to that used in Example 1 was held in a 10 gallon reactor, quenched at about 120° C. with glacial acetic acid, and diluted to about 8% solids (wt. polymer/wt. polymer+wt. solvent) through addition of more o-dichlorobenzene. The mixture was transferred to clean containers and the reactor rinsed with a small amount of o-dichlorobenzene and deionized water to remove any salts that might have adhered to the walls of the reactor. The polymer-containing mixture was returned to the rinsed reactor and heated to 80° C. The mixture was then extracted three times, each time with nine liters deionized water also at 80° C. The phases were mixed each time for ten minutes with gentle agitation. The first two washes were allowed to settle for one hour, and the third wash was allowed to settle for two days at 80° C. For each set of conditions the organic phase was analyzed for sodium by ion chromatography. The sodium content after the first wash was 797 ppm; after the second wash, 223 ppm; and after the third wash, 32 ppm vs. polymer.

EXAMPLE 4

An acid-quenched polyetherimide-containing mixture similar to that used in Example 1 (except diluted to 10% solids) was treated with water to agglomerate salt and filtered. The polyetherimide-containing solution was pumped into a vessel containing water which had been preheated to 90° C. The amount of water was 7750 milliliters representing a 1:6 wt./wt. ratio versus the 10% polymer solution. The phases were mixed by stirring at 100–200 rpm for 1–5 minutes, after which stirring was stopped and the mixture allowed to separate for various times at 90° C. The organic phase was separated and the wash process repeated various numbers of times. No rag layers were observed in the wash processes. Table 3 shows the results of analyses on the organic phase. Sodium was analyzed by ion selective electrode, and HEG and PEG were analyzed by ion chromatography.

TABLE 3

| Analyses condition | Sodium analyses, ppm vs. polymer | HEG analyses, ppm vs. polymer | PEG analyses, ppm vs. polymer |
|---|---|---|---|
| supernatant polymer solution | — | 2210 | 586 |
| after steelwool filtration | 1016 | — | — |
| after cartridge filtration | 26 | 2002 | 533 |

TABLE 3-continued

| Analyses condition | Sodium analyses, ppm vs. polymer | HEG analyses, ppm vs. polymer | PEG analyses, ppm vs. polymer |
|---|---|---|---|
| 1st wash/ 12 hrs. | 13 | 313 | 121 |
| 2nd wash/ 2.5 hrs. | 13 | 206 | 84 |
| 3rd wash/ 36 hrs. | 3 | 154 | 63 |

EXAMPLE 5

The conditions of example 4 were repeated except that the amount of water used was 40 liters representing a 1:1.7 wt./wt. ratio versus the 10% polymer solution. The organic phase was separated and the wash process repeated various numbers of times. No rag layers were observed in the wash processes. Table 4 shows the results of analyses on the organic phase.

TABLE 4

| Analyses condition | Sodium analyses, ppm vs. polymer | HEG analyses, ppm vs. polymer | PEG analyses, ppm vs. polymer |
|---|---|---|---|
| after acid quench | | 2833 | 474 |
| after bag filter | 48 | 2621 | 461 |
| after cartridge filtration | 0 | 2556 | 445 |
| 1st wash/ 12 hrs. | 0 | 116 | 27 |
| 2nd wash/ 2 hrs. | — | 0 | 0 |

EXAMPLE 6

The conditions of example 4 were repeated except that the amount of water used was 40 liters representing a 1:1.7 wt./wt. ratio versus the 10% polymer solution. The organic phase was separated and the wash process repeated various numbers of times. No rag layers were observed in the wash processes. Table 5 shows the results of analyses on the organic phase.

TABLE 5

| Analyses condition | Sodium analyses, ppm vs. polymer | HEG analyses, ppm vs. polymer | PEG analyses, ppm vs. polymer |
|---|---|---|---|
| after bag filter | 437 | 2803 | 537 |
| after cartridge filtration | 0 | 2686 | 515 |
| 1st wash/ 12 hrs. | 8 | 100 | 15 |
| 2nd wash/ 2 hrs. | 0 | 0 | 0 |

EXAMPLE 7

The conditions of example 4 were repeated except that the amount of water used was 317 liters representing a 1:2 wt./wt. ratio versus the 10% polymer solution. The organic phase was separated and the wash process repeated various numbers of times. No rag layers were observed in the wash processes. Table 6 shows the results of analyses on the organic phase.

TABLE 6

| Analyses condition | Sodium analyses, ppm vs. polymer | HEG analyses, ppm vs. polymer | PEG analyses, ppm vs. polymer |
| --- | --- | --- | --- |
| after acid quench | — | 2592 | 371 |
| after bag filter | 11* | 2026* | 326* |
| 1st wash | 0* | 187* | 42* |
| 2nd wash | 0* | 68* | 8* |

*average of two values

EXAMPLE 8

A solution of 90 grams ortho-dichlorobenzene was heated to 150° C. in a 250 milliliter (ml) round-bottom, three neck flask equipped with a condenser and an overhead stirrer. To the solution was added 10 grams of a polyetherimide over 20 minutes with stirring. The polyetherimide comprised structural units derived from bisphenol A and 1,3-bis[N-4-chlorophthalimido]benzene. The polymer was allowed to dissolve completely over 3 hours. The temperature of polymer solution was reduced to 95° C. To this polymer solution was added 50 ml of boiling deionized water and the internal temperature was maintained at 95° C. The solution was stirred at 220 rpm for 2 minutes and then stirring was discontinued. Within 4 minutes the phases separated completely. The solution was then stirred at 220 rpm for 1 hour after which stirring was discontinued. The separation of the two phases was very slow. After two hours a transparent aqueous layer was obtained with a polymer film on top of the aqueous layer. The predominantly organic phase was still emulsified. On standing overnight the emulsion did not seem to break.

The transparent aqueous phase was separated and the organic phase containing emulsion was heated under stirring to distill off water. The organic phase was finally heated to increase the temperature to 140° C. during which time the polymer solution became clear again. The solution was then cooled to 95° C. Stirring was discontinued and 50 ml of boiling deionized water was added to the solution. The mixture was stirred for three minutes and then the stirring was discontinued. The two phases separated immediately into transparent phases. This demonstrates that heat treatment is beneficial to phase separation in subsequent water washes.

EXAMPLE 9

A polyetherimide was prepared in o-dichlorobenzene through the reaction of bisphenol A disodium salt and 1,3-bis[N-4-chlorophthalimido]benzene in the presence of hexaethylguanidinium chloride catalyst (HEG). The acid-quenched polymer solution was diluted with ortho-dichlorobenzene to 10% polymer solution, and 881 grams of solution was placed in a 2 liter vessel fitted with an overhead condenser, a thermometer, a nitrogen inlet, an extra port for addition of reagents and a bottom drain valve. The solution was heated to 95° C. and 432 grams of deionized water was added maintaining the temperature of the mixture in a range of about 93–96° C. The solution was stirred for 15 minutes at 170 rpm after which stirring was discontinued. Separation of the phases was complete in two hours. The organic layer was turbid and most of the rag material came in the organic phase. Polymer film formed at the top of aqueous layer. The two phases were well separated at the boundary.

The two layers were separated through bottom drain valve, and the organic phase was transferred back to the vessel. The organic phase was heated and the temperature raised to 142° C. when the solution became transparent barring a few floating polymer particles. On cooling the solution became slightly more hazy with more particles seen but much less than after the first wash. When the temperature reached 104° C., 445 ml hot deionized water (93–96° C.) was added. When the temperature of the wash reach 95° C., stirring was started. Slow azeotropic removal of water and ortho-dichlorobenzene was observed. Stirring was continued for 15 minutes at 120 rpm and then stopped. Clear separation was observed between the phases in 10 minutes. The temperature of the mixture was maintained between about 87° C. and about 90° C. for one hour. There was a thin polymer layer on top of aqueous layer, the aqueous layer was clear, and the organic layer was slightly turbid. There was practically no rag layer. The two layers could be separated very easily.

The organic phase was transferred back to the vessel and the temperature was raised to 138° C. There were some polymer particles seen in the organic phase, but the amount was less. The temperature of the solution was reduced to 105° C. and 432 grams hot deionized water (93–96° C.) was added. The temperature of the mixture was reduced to 87° C. and the mixture was stirred at 170 rpm for 15 minutes. Some azeotropic removal of water and ortho-dichlorobenzene was observed. Stirring was stopped and the mixture was allowed stand. Phase separation took place more slowly than in the second wash but there was only a very small rag layer at the end of one hour. A thin layer of polymer was seen on top of the aqueous layer. The organic layer was slightly turbid but the two layers could be easily separated. This demonstrates that heat treatment is beneficial to phase separation in subsequent water washes.

EXAMPLE 10

Four washing experiments were performed on a polyetherimide solution similar to that from the previous example by stirring for 15 minutes followed by settling time of 30 minutes. Between each washing step the temperature of the organic phase was raised to 135–140° C. The washings were done typically at 90° C. Little or no emulsion formation was observed and the separation of phases was fairly easy as in Example 9.

EXAMPLE 11

A polyetherimide-containing mixture similar to that used in Example 1 and containing about 800 ppm soluble ionic chloride in the form of hexaethylguanidinium chloride was quenched at about 43° C. with anhydrous hydrochloric acid, and diluted to about 5% solids (wt. polymer/wt. polymer+ wt. solvent) through addition of more o-dichlorobenzene. The mixture was treated with silica gel (60–200 mesh; 0.5 grams per 10 g. of polymer in solution) and stirred at 60° C. The mixture was filtered and the filtrate analyzed for soluble ionic chloride by titration. The soluble ionic chloride value was 75 ppm based on polyetherimide.

EXAMPLE 12

An acid-quenched polyetherimide-containing mixture similar to that used in Example 1 (except diluted to 10% solids) was treated with water to agglomerate salt and filtered. The polymer-containing filtrate was treated with 0.37 wt. % (based on polymer solution) silica gel at 90° C., and stirred for 6.5 hours at 100–200 rpm. Samples were taken periodically for analysis. After 5.5 hours additional silica gel was added to bring the total amount to 0.7 wt. %.

Sodium was analyzed by ion selective electrode, and HEG and PEG were analyzed by ion chromatography. Analyses are summarized in Table 7.

TABLE 7

| Analyses condition | HEG analyses, ppm vs. polymer | PEG analyses, ppm vs. polymer |
|---|---|---|
| 1 hr. | 142 | 334 |
| 2 hr. | 131 | 49 |
| 5.5 hr. | 124 | 57 |
| 6.5 hr. | 0 | 0 |

After 6.5 hours the mixture was filtered through a 25 micrometer bag filter by gravity and then pumped through a 5 micrometer cartridge filter. The sodium level (determined by ion selective electrode) was 300 ppm after bag filtering and 45 ppm (based on polyetherimide) after cartridge filtering.

EXAMPLE 13

An acid-quenched polyetherimide-containing mixture similar to that used in Example 1 (except diluted to 10% solids) was treated with water to agglomerate salt and filtered. The polymer-containing filtrate (70.9 kilograms) was treated with 500 grams silica gel (60–200 mesh) at 90° C., and stirred at 400 rpm. Samples were taken periodically for analysis. Analyses are summarized in Table 8.

TABLE 8

| Analyses condition | Na analyses, ppm vs. polymer | HEG analyses, ppm vs. polymer | PEG analyses, ppm vs. polymer |
|---|---|---|---|
| after acid quench | — | 2592 | 371 |
| after filtration | 11* | 2026* | 326* |
| after 1 hr. with silica gel | — | 0 | 0 |

*average of two values

EXAMPLE 14

An acid-quenched polyetherimide-containing mixture similar to that used in Example 1 (except diluted to 10% solids) was treated with water to agglomerate salt and filtered. About 90 grams of polyetherimide-containing solution was filtered at 90° C. a second time through a 10 micrometer pore size polytetrafluoroethylene membrane which had been loaded with 5 grams of silica gel (60–200 mesh). Filtration was repeated twice more at 90° C. through the same silica gel on the membrane. Analyses are summarized in Table 9.

TABLE 9

| Analyses condition | HEG analyses, ppm vs. polymer | PEG analyses, ppm vs. polymer |
|---|---|---|
| before filtration | 2227 | 614 |
| after 1st filtration | 246 | 200 |
| after 2nd filtration | 119 | 97 |

EXAMPLE 15

An acid-quenched polyetherimide-containing mixture similar to that used in Example 1 (except diluted to 10% solids) was treated with water to agglomerate salt but not filtered. About 75 grams of polyetherimide-containing solution was filtered at 90° C. through a 10 micrometer pore size polytetrafluoroethylene membrane which had been loaded with 10 grams of silica gel (60–200 mesh). Sodium was analyzed by ion selective electrode, and HEG and PEG were analyzed by ion chromatography. The filtered polymer solution contained no detectable HEG or PEG species and no detectable sodium ion by analysis.

EXAMPLE 16

An acid-quenched polyetherimide-containing mixture similar to that used in Example 1 (except at 10% solids) was treated with water to agglomerate salt and filtered. The polymer-containing filtrate (150 grams) was treated with 0.5 grams silica gel (60–200 mesh) at 90° C., and stirred at 250 rpm for 15 minutes. The mixture was then filtered through a 10 micrometer pore size membrane. Samples were analyzed as summarized in Table 10.

TABLE 10

| Analyses condition | Na analyses, ppm vs. polymer | HEG analyses, ppm vs. polymer | PEG analyses, ppm vs. polymer |
|---|---|---|---|
| before silica gel treatment | 2.5 | 1640 | 282 |
| after membrane filtration | — | 0 | 0 |

EXAMPLE 17

An acid-quenched polyetherimide-containing mixture similar to that used in Example 1 (except at 10% solids) was treated with water to agglomerate salt and filtered. The polymer-containing filtrate (150 grams) was treated with 5.0 grams silica gel (60–200 mesh) at 90° C., and stirred at 250 rpm for 5 minutes. The mixture was then filtered through a 10 micrometer pore size membrane. Samples were analyzed as summarized in Table 11.

TABLE 11

| Analyses condition | Na analyses, ppm vs. polymer | HEG analyses, ppm vs. polymer | PEG analyses, ppm vs. polymer |
|---|---|---|---|
| before silica gel treatment | 6 | 833 | 372 |
| after membrane filtration | — | 0 | 0 |

EXAMPLE 18

An acid-quenched polyetherimide-containing mixture similar to that used in Example 1 at 15% solids was treated with water to agglomerate salt and filtered. Samples of the polymer-containing filtrate (100 grams) were treated with 0.05 grams silica gel (60–200 mesh) at 90° C., and stirred at 250 rpm for various times. Each mixture was then filtered through a 10 micrometer pore size membrane. Analyses on samples after silica gel treatment and membrane filtration are summarized in Table 12. Before silica gel treatment the solution showed 0 ppm sodium, 445 ppm HEG, and 230 ppm PEG.

TABLE 12

| Stirring time, minutes | HEG analyses, ppm vs. polymer | PEG analyses, ppm vs. polymer |
|---|---|---|
| 5 | 337 | 191 |
| 15 | 267 | 174 |
| 30 | 291 | 179 |

EXAMPLE 19

An acid-quenched polyetherimide-containing mixture similar to that used in Example 1 at 15% solids was treated with water to agglomerate salt and filtered. Samples of the polymer-containing filtrate (100 grams) were treated with various amounts of silica gel (60–200 mesh, unless noted) at 90° C., and stirred at 250 rpm for 5 minutes. Each mixture was then filtered through a 10 micrometer pore size membrane. Analyses on samples after silica gel treatment and membrane filtration are summarized in Table 13. Before silica gel treatment the solution showed 0 ppm sodium, 2256 ppm HEG, and 445 ppm PEG.

TABLE 13

| Silica gel amount, grams | HEG analyses, ppm vs. polymer | PEG analyses, ppm vs. polymer |
|---|---|---|
| 0.10 | 1965 | 389 |
| 0.05 | 2208 | 408 |
| 0.05* | 2524 | 467 |
| 0.20 | 1423 | 318 |
| 0.30 | 1009 | 248 |
| 0.40 | 724 | 184 |

*silica gel mesh size 28-200

EXAMPLE 20

An acid-quenched polyetherimide-containing mixture similar to that used in Example 1 at 15% solids was treated with water to agglomerate salt and filtered. Samples of the polymer-containing filtrate (100 grams) were treated with various amounts of silica gel (60–200 mesh, unless noted) at 90° C., and stirred at 250 rpm for 5 minutes. Each mixture was then filtered through a 10 micrometer pore size membrane. Analyses on samples after silica gel treatment and membrane filtration are summarized in Table 14. Before silica gel treatment the solution showed 0 ppm sodium, 821 ppm HEG, and 377 ppm PEG.

TABLE 14

| Silica gel amount, grams | Stirring time, minutes | HEG analyses, ppm vs. polymer | PEG analyses, ppm vs. polymer |
|---|---|---|---|
| 0.50 | 5 | 164 | 133 |
| 0.50* | 15 | 5 | 5 |
| 0.20 | 15 | 108 | 40 |
| 0.20 | 10 | 220 | 140 |
| 0.50 | 10 | 36 | 5 |
| 0.20 | 5 | 296 | 163 |
| 0.05 | 30 | 560 | 318 |

*silica gel mesh size 28-200

EXAMPLE 21

An acid-quenched polyetherimide-containing mixture similar to that used in Example 1 at 10% solids was treated with water to agglomerate salt and filtered. Samples of the polymer-containing filtrate were treated with various amounts of silica gel (60–200 mesh) at 90° C., and stirred at 250 rpm for various times. Each mixture was then filtered through a 10 micrometer pore size membrane. Analyses on samples after silica gel treatment and membrane filtration are summarized in Table 15. Before silica gel treatment the solution showed 0 ppm sodium, 2686 ppm HEG, and 515 ppm PEG.

TABLE 15

| Silica gel amount, grams | Stirring time, minutes | HEG analyses, ppm vs. polymer | PEG analyses, ppm vs. polymer |
|---|---|---|---|
| 0.10 | 0.5 | 1257 | 369 |
| 0.10 | 1 | 1558 | 494 |
| 0.10 | 2 | 1001 | 361 |
| 0.10 | 5 | 1044 | 343 |
| 0.10 | 16 | 1122 | 380 |
| 0.10 | 21 | 993 | 341 |
| 0.05 | 0.5 | 2041 | 485 |
| 0.05 | 1 | 2287 | 548 |
| 0.05 | 5 | 1791 | 471 |
| 0.05 | 18 | 2035 | 501 |
| 0.05 | 23 | 2110 | 511 |
| 0.25 | 1 | 68 | 17 |
| 0.25 | 5 | 0 | 0 |
| 0.20 | 1 | 122 | 69 |
| 0.20 | 5 | 103 | 37 |
| 0.15 | 1 | 446 | 182 |
| 0.15 | 23.5 | 435 | 169 |

EXAMPLE 22

A polyetherimide was prepared in o-dichlorobenzene through the reaction of bisphenol A disodium salt and 1,3-bis[N-4-chlorophthalimido]benzene in the presence of hexaethylguanidinium chloride catalyst (HEG). The polymer-containing mixture was quenched at a temperature between 150° C. and 180° C. with phosphoric acid and diluted to about 10% solids (wt. polymer/wt. polymer+wt. solvent) through addition of more o-dichlorobenzene. The polyetherimide-containing solution was treated at 90° C. with 300 milliliters water (6.6 wt. % versus polyetherimide; 0.65 wt. % versus 10% polyetherimide-containing solution) and stirred for 7 minutes at 112 rpm, the 1 minute at 160 rpm. The mixture was allowed to settle for 15 minutes at 90° C. then filtered once through steelwool and once through a 5 micrometer cartridge filter. Sodium was analyzed by ion selective electrode, and HEG and PEG were analyzed by ion chromatography. Analyses are summarized in Table 16.

TABLE 16

| Analyses condition | Na analyses, ppm vs. polymer | HEG analyses, ppm vs. polymer | PEG analyses, ppm vs. polymer |
|---|---|---|---|
| supernatant solution | — | 2210 | 586 |
| after steelwool filtration | 1016 | — | — |
| after cartridge filtration | 26* | 2002 | 533 |

*average of two values

EXAMPLE 23

An acid-quenched polyetherimide-containing solution similar to that in Example 22 was treated at 90° C. with 225 milliliters water (3.3 wt. % versus polyetherimide; 0.32 wt. % versus 10% polyetherimide-containing solution) and stirred for 3 minutes at 92 rpm. The mixture was allowed to settle for 25 minutes at 90° C. then filtered once through a 50 micrometer bag filter and once through a 5 micrometer cartridge filter. Analyses are summarized in Table 17.

TABLE 17

| Analyses condition | Na analyses, ppm vs. polymer | HEG analyses, ppm vs. polymer | PEG analyses, ppm vs. polymer |
|---|---|---|---|
| after acid quench | — | 2833 | 474 |
| after bag filtration | 48 | 2621 | 461 |
| after cartridge filtration | 0 | 2556 | 445 |

EXAMPLE 24

An acid-quenched polyetherimide-containing solution similar to that in Example 22 was treated at 90° C. with 225 milliliters water (3.3 wt. % versus polyetherimide; 0.33 wt. % versus 10% polyetherimide-containing solution) and stirred for 4 minutes at 93 rpm. The mixture was not allowed to settle. The water was removed by distillation at about 180° C., after which the solution was filtered once through a 100 micrometer bag filter and once through a 5 micrometer cartridge filter. Analyses are summarized in Table 18.

TABLE 18

| Analyses condition | Na analyses, ppm vs. polymer | HEG analyses, ppm vs. polymer | PEG analyses, ppm vs. polymer |
|---|---|---|---|
| after acid quench | — | 3328* | 661* |
| after bag filtration | 437 | 2803 | 537 |
| after cartridge filtration | 0 | 2686 | 515 |

*approximate values

EXAMPLE 25

An acid-quenched polyetherimide-containing solution similar to that in Example 22 was treated at 90° C. with 1765 milliliters water (3.3 wt. % versus polyetherimide; 0.32 wt. % versus 10% polyetherimide-containing solution) and stirred for 1 minute. The mixture was allowed to settle for 2 hours at 90° C. then filtered once through a 25 micrometer bag filter. Analyses are summarized in Table 19.

TABLE 19

| Analyses condition | Na analyses, ppm vs. polymer | HEG analyses, ppm vs. polymer | PEG analyses, ppm vs. polymer |
|---|---|---|---|
| after acid quench | — | 2592 | 371 |
| after bag filtration | 11* | 2026* | 326* |

*average of two values

EXAMPLE 26

A polyetherimide was prepared in o-dichlorobenzene through the reaction of bisphenol A disodium salt and 1,3-bis[N-4-chlorophthalimido]benzene in the presence of hexaethylguanidinium chloride catalyst (HEG). The polymer-containing mixture was quenched with phosphoric acid and diluted to about 10% solids (wt. polymer/wt. polymer+wt. solvent) through addition of more o-dichlorobenzene. A portion of the polyetherimide-containing solution was treated at 90° C. with 5 milliliters water (3.3 wt. % versus 10% polyetherimide-containing solution) and stirred for 1 minute at 450 rpm. The water was removed by distillation at about 180° C., after which the solution was filtered through a 5 micrometer cartridge filter to give an organic solution containing 500 ppm sodium. The organic solution was then washed three times with 15–20 ml. water (with 0.5–1 hour settling time for each wash before separating the layers) to give an organic solution containing 450 ppm sodium. Sodium was analyzed gravimetrically as sodium chloride following ashing to remove other species.

EXAMPLE 27

An acid-quenched polyetherimide-containing solution as in Example 26 was treated at 90° C. with 3 milliliters water (1.5 wt. % versus 10% polyetherimide-containing solution) and stirred for 1 minute at 450 rpm. After standing, the solution was decanted to give an organic solution containing 90 ppm sodium, 2932 ppm PEG, and 453 ppm HEG. The organic solution was then washed three times with 25 ml. water (with 1–2 hour settling time for each wash before separating the layers) to give an organic solution containing 46 ppm sodium, 19 ppm PEG, and 22 ppm HEG. Sodium was analyzed by ion selective electrode.

EXAMPLE 28

An acid-quenched polyetherimide-containing solution as in Example 26 was treated at 90° C. with 3 milliliters water (1.5 wt. % versus 10% polyetherimide-containing solution) and stirred for 1 minute at 450 rpm. After standing, the solution was filtered under pressure through a 5 micrometer cartridge filter to give an organic solution containing 4430 ppm sodium, 3184 ppm HEG, and 330 ppm PEG. The organic solution was then washed three times with 25 ml. water (with 1 hour settling time for each wash before separating the layers) to give an organic solution containing 400 ppm sodium, 85 ppm HEG, and 5 ppm PEG. Sodium was analyzed by ion selective electrode.

EXAMPLE 29

An acid-quenched polyetherimide-containing solution as in Example 26 was treated at 90° C. with 1 milliliter water (0.67 wt. % versus 10% polyetherimide-containing solution) and stirred for 1 minute at 450 rpm. The water was removed by distillation at about 180° C., after which the solution was filtered through a 5 micrometer cartridge filter to give an organic solution containing 9 ppm sodium, 2141 ppm HEG, and 502 ppm PEG (each an average of two values). The organic solution was then washed three times with 25 ml. water (with 1 hour settling time for each wash before separating the layers) to give an organic solution containing 0 ppm sodium, 45 ppm HEG, and 7 ppm PEG. Sodium was analyzed by ion selective electrode.

EXAMPLE 30

An acid-quenched polyetherimide-containing solution as in Example 26 was treated at 90° C. with 1 milliliter water (0.67 wt. % versus 10% polyetherimide-containing solution)

and stirred for 1 minute at 450 rpm. The water was removed by distillation at about 180° C., after which the solution was filtered through a 5 micrometer cartridge filter to give an organic solution containing 8 ppm sodium, 2484 ppm HEG, and 676 ppm PEG (each an average of two values). The organic solution was then washed three times with 25 ml. water (with 1 hour settling time for each wash before separating the layers) to give an organic solution containing 0 ppm sodium, 147 ppm HEG, and 46 ppm PEG. Sodium was analyzed by ion selective electrode.

EXAMPLE 31

An acid-quenched polyetherimide-containing solution as in Example 26 was treated at 90° C. with 0.75 milliliters water (0.5 wt. % versus 10% polyetherimide-containing solution) and stirred for 1 minute at 450 rpm. The water was removed by distillation at about 180° C., after which the solution was filtered through a 5 micrometer cartridge filter to give an organic solution containing 0 ppm sodium, 1093 ppm HEG, and 217 ppm PEG. The organic solution was then washed three times with 25 ml. water (with 1–3 hour settling time for each wash before separating the layers) to give an organic solution containing 0 ppm sodium, 38 ppm HEG, and 8 ppm PEG. Sodium was analyzed by ion selective electrode.

EXAMPLE 32

A polyetherimide was prepared in o-dichlorobenzene through the reaction of bisphenol A disodium salt and 1,3-bis[N-4-chlorophthalimido]benzene in the presence of hexaethylguanidinium chloride catalyst (HEG). A 150 gram portion of the polymer-containing mixture was quenched with 2 ml. acetic acid and diluted to about 10% solids (wt. polymer/wt. polymer+wt. solvent) through addition of more o-dichlorobenzene. The polyetherimide-containing solution was treated at 90° C. with 0.5 milliliters water and stirred for 1 minute at 450 rpm. The mixture was filtered to give an organic solution containing 42 ppm sodium, 2488 ppm HEG, and 245 ppm PEG. The organic solution was then washed three times with 20 ml. water (with 1–2 hour settling time for each wash before separating the layers) to give an organic solution containing 14 ppm sodium, 798 ppm HEG, and 104 ppm PEG. Sodium was analyzed by ion selective electrode.

EXAMPLE 33

A 150 gram portion of the polymer-containing mixture as in Example 32 was quenched with acetic acid (0.5 wt. % based on polymer solution). The polyetherimide-containing solution was treated at 90° C. with 0.5 milliliters water and stirred for 1 minute at 450 rpm. The mixture was filtered to give an organic solution containing 0 ppm sodium, 3192 ppm HEG, and 589 ppm PEG. The organic solution was then washed three times with 20 ml. water (with 1.5–2 hour settling time for each wash before separating the layers) to give an organic solution containing 23 ppm sodium, 1303 ppm HEG, and 350 ppm PEG. Some emulsion formation was observed in each wash. Sodium was analyzed by ion selective electrode.

EXAMPLE 34

A polyetherimide was prepared in o-dichlorobenzene through the reaction of bisphenol A disodium salt and 1,3-bis[N-4-chlorophthalimido]benzene in the presence of hexaethylguanidinium chloride catalyst (HEG). A portion of acid-quenched polymer-containing mixture at 15% solids level was treated at 90° C. several times with various amounts of water each time stirring the mixture for 3 minutes at 250 rpm. Table 20 shows the results of the water extractions. Sodium was analyzed by ion selective electrode.

TABLE 20

| Wash number | Settling Time (hours) | Observations | Water phase recovered (vs. initial amount) |
|---|---|---|---|
| 1 | 1.5 | — | 38 ml. (40 ml. initial) |
| 2 | 12 | emulsion | 20 ml. (40 ml. initial) |
| 3 | 1 | emulsion | 37 ml. (40 ml. initial) |
| 4 | 2 | emulsion | 20 ml. (25 ml. initial) |
| 5 | 2 | emulsion | 11 ml. (15 ml. initial) |

After the fifth wash, the organic solution contained 43 ppm sodium, 0 ppm HEG, and 0 ppm PEG. The difference between the recovered and initial water phase amounts shows the amount lost during emulsification.

EXAMPLE 35

The procedure of Example 34 was repeated except that the polyetherimide-solution was at 10% solids level. Table 21 shows the results of the water Sodium was analyzed gravimetrically as sodium chloride by ashing. Little emulsion formation was observed in the water washes.

TABLE 21

| Wash number | Settling Time (hours) | Water phase recovered (vs. initial amount) |
|---|---|---|
| 1 | 2 | 28 ml. (30 ml. initial) |
| 2 | 2 | 28 ml. (30 ml. initial) |
| 3 | 1.5 | 25 ml. (30 ml. initial) |
| 4 | 1.5 | 27 ml. (30 ml. initial) |

After the fourth wash, the organic solution contained 1380 ppm sodium.

EXAMPLE 36

The procedure of Example 34 was repeated except that the polyetherimide-solution was filtered through a 10 micrometer cartridge filter after the washes were completed. Table 22 shows the results. Sodium was analyzed by ion selective electrode.

TABLE 22

| Analyses after | Settling Time (hours) | Observ. | Water phase recovered (vs. initial amount) | Na analyses, ppm vs. polymer | HEG analyses, ppm vs. polymer | PEG analyses, ppm vs. polymer |
|---|---|---|---|---|---|---|
| wash 1 | 1.5 | — | 34 ml. (45 ml. initial) | 14078* | 266* | 539* |
| wash 2 | 4 | emulsion | 18 ml. (30 ml. initial) | — | — | — |
| wash 3 | 12 | emulsion | 12 ml. (20 ml. initial) | 4853 | 90 | 186 |
| filtration | — | — | — | 170 | 104 | 183 |

*average of two values

EXAMPLE 37

The procedure of Example 36 was repeated except that the polyetherimide-containing solution was at 10% solids level. Table 23 shows the results.

TABLE 23

| Analyses after | Settling Time (hours) | Observ. | Water phase recovered (vs. initial amount) | Na analyses, ppm vs. polymer | HEG analyses, ppm vs. polymer | PEG analyses, ppm vs. polymer |
|---|---|---|---|---|---|---|
| wash 1 | 1.5 | — | 38 ml. (45 ml. initial) | — | 59 | 107 |
| wash 2 | 2 | — | 29 ml. (30 ml. initial) | — | — | — |
| wash 3 | 2 | emulsion | 15 ml. (20 ml. initial) | 355 | 5 | 13 |
| filtration | — | — | — | 312 | 0 | 0 |

EXAMPLE 38

A polyetherimide was prepared in o-dichlorobenzene through the reaction of bisphenol A disodium salt and 1,3-bis[N-4-chlorophthalimido]benzene in the presence of hexaethylguanidinium chloride catalyst (HEG). A portion (100 grams) of acid-quenched polymer-containing mixture at 15% solids level was treated with 3 milliliters of water and slowly stirred, after which the water was removed by distillation. The mixture was filtered through a 10 micrometer pore size filter to remove agglomerated sodium chloride. The filtrate was stirred twice with water at 90° C. for 3 minutes at 250 rpm. Table 24 shows the results. Sodium was analyzed by ion selective electrode.

TABLE 24

| Analyses after | Settling Time (hours) | Observ. | Water phase recovered (vs. initial amount) | Na analyses, ppm vs. polymer | HEG analyses, ppm vs. polymer | PEG analyses, ppm vs. polymer |
|---|---|---|---|---|---|---|
| filtration | — | — | — | 10 | 75 | 269 |
| wash 1 | 2 | emulsion | 25 ml. (30 ml. initial) | — | — | — |
| wash 2 | 2 | emulsion | 9 ml. (25 ml. initial) | 11 | 3 | 28 |

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. Although some particular embodiments of the invention concern methods for purification of a polyetherimide in an ODCB solution, it is to be understood that the invention discloses methods which are suitable for the purification of any polyether made by a halide displacement polymerization method in a water-immiscible solvent with boiling point at atmospheric pressure of greater than 110° C. and a density ratio to water of greater than 1.1:1 at 20–25° C. All U.S. Patents cited herein are incorporated herein by reference.

What is claimed is:

1. A method for purifying a mixture comprising (i) an aromatic polyether reaction product made by a halide displacement polymerization process, (ii) a catalyst, (iii) an alkali metal halide, and (iv) a substantially water-immiscible organic solvent with boiling point at atmospheric pressure of greater than 110° C. and a density ratio to water of greater than 1.1:1 at 20–25° C., comprising the steps of:

(a) subjecting the mixture to at least one solid separation step;
   (b) followed by quenching the mixture with acid; and
   (c) contacting the organic solution at least once with water and separating the water-containing phase from the organic phase.

2. The method of claim 1 wherein the aromatic polyether comprises the reaction product of at least one alkali metal salt of a dihydroxy-substituted aromatic hydrocarbon with at least one substituted aromatic compound of the formula (I):

$$Z(A^1\text{—}X^1)_2 \quad (I)$$

wherein Z is an activating radical, $A^1$ is an aromatic radical and $X^1$ is fluoro, chloro, bromo, or nitro.

3. The method of claim 2 wherein the moiety —$A^1$—Z—$A^1$— is a bis(arylene) sulfone, bis(arylene) ketone, tris(arylene)bis(sulfone), tris(arylene)bis(ketone), bis(arylene) benzo-1,2-diazine, bis(arylene)azoxy radical, or a bisimide radical illustrated by the formula (VII):

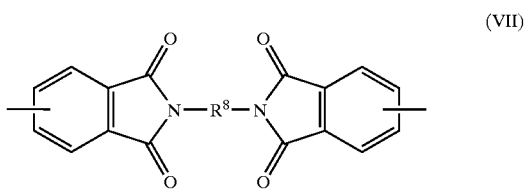

(VII)

wherein $R^8$ is a substituted or unsubstituted $C_{6-20}$ divalent aromatic hydrocarbon radical, a $C_{2-22}$ alkylene or cycloalkylene radical, a $C_{2-8}$ bis(alkylene-terminated) polydiorganosiloxane radical or a divalent radical of the formula (VIII):

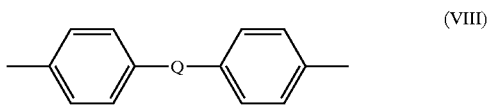

(VIII)

in which Q is isopropylidene, methylene,

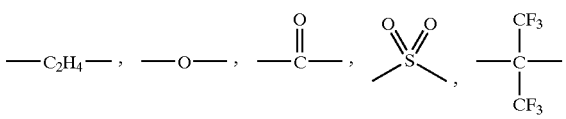

or a covalent bond, or wherein Z is polyvalent and with $A^1$ forms part of a fused ring system, a benzimidazole, benzoxazole, quinoxaline or benzofuran.

4. The method of claim 1 wherein the aromatic polyether is selected from the group consisting of polyethersulfones, polyetherketones, polyetheretherketones, and polyetherimides.

5. The method of claim 4 wherein the aromatic polyether is an aromatic polyetherimide.

6. The method of claim 5 wherein the aromatic polyetherimide comprises the reaction product of a bisphenol A moiety with at least one of 1,3-bis[N-(4-chlorophthalimido)]benzene, 1,4-bis[N-(4-chlorophthalimido)]benzene, 1,3-bis[N-(3-chlorophthalimido)]benzene, 1,4-bis[N-(3-chlorophthalimido)]benzene, 1-[N-(4-chlorophthalimido)]-3-[N-(3-chlorophthalimido)benzene, or 1-[N-(4-chlorophthalimido)]-4-[N-(3-chlorophthalimido)benzene.

7. The method of claim 1 wherein the catalyst is at least one member selected from the group consisting of hexaalkylguanidinium salts and alpha,omega-bis(pentaalkylguanidinium)alkane salts.

8. The method of claim 1 wherein the alkali metal halide is sodium chloride.

9. The method of claim 1 wherein the solid separation step comprises at least one of a filtration step, a centrifugation step, or a decantation step.

10. The method of claim 9 wherein the solid separation step comprises a filtration step performed at a temperature in a range of between about 25° C. and about 220° C.

11. The method of claim 10 wherein the filtration step is performed at a temperature in a range of between about 60° C. and about 180° C.

12. The method of claim 9 wherein the solid separation step is performed using at least one of a dead-end filter, cross-flow filter, liquid-solid cyclone separator, vacuum drum filter, bag centrifuge, or vacuum conveyor belt separator.

13. The method of claim 1 wherein the acid is selected from the group consisting of organic acids, acetic acid, inorganic acids, phosphorous acid, phosphoric acid, and hydrochloric acid.

14. The method of claim 1 wherein the organic solvent is o-dichlorobenzene.

15. The method of claim 14 wherein the o-dichlorobenzene phase is mixed and heated to a temperature between the boiling point of water and the boiling point of o-dichlorobenzene under the prevailing pressure before at least one solid separation step.

16. The method of claim 15 wherein the o-dichlorobenzene phase is heated to a temperature in a range between about 110° C. and about 180° C. at atmospheric pressure.

17. The method of claim 15 wherein a portion of alkali metal halide is in a form that can be separated in a solid separation step following application of heat.

18. The method of claim 14 wherein the o-dichlorobenzene phase is treated at least once with a solid medium to adsorb catalyst species before a solid separation step.

19. The method of claim 18 wherein the o-dichlorobenzene phase is treated at least once with a solid medium to adsorb catalyst species after substantial removal of alkali metal halide from the phase.

20. The method of claim 18 wherein at least one catalyst is recovered from the solid medium after solid separation.

21. The method of claim 20 wherein the catalyst is at least one member selected from the group consisting of hexaalkylguanidinium salts and alpha,omega-bis(pentaalkylguanidinium)alkane salts.

22. The method of claim 18 in which the solid medium comprises silica.

23. The method of claim 1 wherein the water phase from an extraction is treated to recover catalyst.

24. The method of claim 23 wherein the catalyst is at least one member selected from the group consisting of hexaalkylguanidinium salts and alpha,omega-bis(pentaalkylguanidinium)alkane salts.

25. A method for purifying a mixture comprising (i) an aromatic polyether reaction product made by a halide displacement polymerization process, (ii) a catalyst, (iii) an alkali metal halide, and (iv) a substantially water-immiscible organic solvent with boiling point at atmospheric pressure of greater than 110° C. and a density ratio to water of greater than 1.1:1 at 20–25° C., comprising: at least one solid separation step, and at least one ion exchange step.

26. The method of claim 25 wherein the aromatic polyether comprises the reaction product of at least one alkali metal salt of a dihydroxy-substituted aromatic hydrocarbon at least one substituted aromatic compound of the formula (I):

wherein Z is an activating radical, $A^1$ is an aromatic radical and $X^1$ is fluoro, chloro, bromo, or nitro.

27. The method of claim 26 wherein the moiety —$A^1$—Z—$A^1$— is a bis(arylene)sulfone, bis(arylene)ketone, tris(arylene)bis(sulfone), tris(arylene)bis(ketone), bis(arylene)benzo-1,2-diazine, bis(arylene)azoxy radical, or a bisimide radical illustrated by the formula (VII):

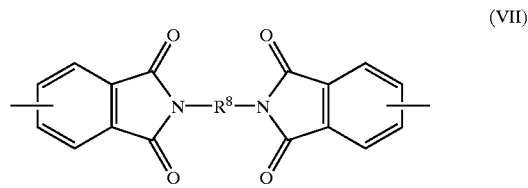

wherein $R^8$ is a substituted or unsubstituted $C_{6-20}$ divalent aromatic hydrocarbon radical, a $C_{2-22}$ alkylene or cycloalkylene radical, a $C_{2-8}$ bis(alkylene-terminated) polydiorganosiloxane radical or a divalent radical of the formula (VIII):

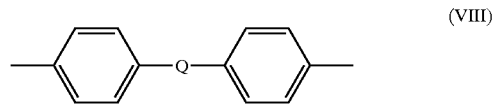

in which Q is isopropylidene, methylene,

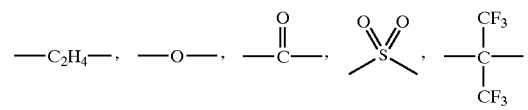

or a covalent bond, or wherein Z is polyvalent and with $A^1$ forms part of a fused ring system, a benzimidazole, benzoxazole, quinoxaline or benzofuran.

28. The method of claim 25 wherein the aromatic polyether is selected from the group consisting of polyethersulfones, polyetherketones, polyetheretherketones and polyetherimides.

29. The method of claim 28 wherein the aromatic polyether is an aromatic polyetherimide.

30. The method of claim 29 wherein the aromatic polyetherimide comprises the reaction product of a bisphenol A moiety with at least one of 1,3-bis[N-(4-chlorophthalimido)]benzene, 1,4-bis[N-(4-chlorophthalimido)]benzene, 1,3-bis[N-(3-chlorophthalimido)]benzene, 1,4-bis[N-(3-chlorophthalimido)]benzene, 1-[N-(4-chlorophthalimido)]-

3-[N-(3-chlorophthalimido)benzene, or 1-[N-(4-chlorophthalimido)]-4-[N-(3-chlorophthalimido)benzene.

31. The method of claim 25 wherein the alkali metal halide is sodium chloride.

32. The method of claim 25 wherein the solid separation step comprises at least one of a filtration step, a centrifugation step, or a decantation step.

33. The method of claim 32 wherein the solid separation step comprises a filtration step performed at a temperature in a range of about between about 25° C. and about 220° C.

34. The method of claim 33 wherein the filtration step is performed at a temperature in a range of between about 60° C. and about 180° C.

35. The method of claim 25 wherein the ion exchange step employs an ion exchange resin.

36. The method of claim 35 wherein the ion exchange resin is treated to recover catalyst.

37. The method of claim 36 wherein the catalyst is at least one member selected from the group consisting of hexaalkylguanidinium salts and alpha,omega-bis(pentaalkylguanidinium)alkane salts.

38. The method of claim 25 wherein the organic solvent is o-dichlorobenzene.

39. The method of claim 25 further comprising at least one step of contacting the organic solution with water and separating the water-containing phase from the organic phase.

40. The method of claim 39 wherein the mixture is quenched with acid before at least one contacting with water extraction step.

41. The method of claim 40 wherein the acid is selected from the group consisting of organic acids, acetic acid, inorganic acids, phosphorous acid, phosphoric acid, and hydrochloric acid.

42. A method for purifying a mixture comprising (i) an aromatic polyether reaction product made by a halide displacement polymerization process, (ii) a catalyst, (iii) an alkali metal halide, and (iv) a substantially water-immiscible organic solvent with boiling point at atmospheric pressure of greater than 110° C. and a density ratio to water of greater than 1.1:1 at 20–25° C., comprising the steps of:

(a) providing to the mixture an amount of water in a range between about 0.005 wt. % and about 10 wt. % based on weight of polyether, followed by;

(b) mixing the phases, wherein a portion of alkali metal halide is in a form that can be separated by a solid separation step following mixing; and (c) subjecting the mixture to at least one solid separation step.

43. The method of claims 42 wherein the aromatic polyether comprises the reaction product of at least one alkali metal salt of a dihydroxy-substituted aromatic hydrocarbon with at least one substituted aromatic compound of the formula (I):

$$Z(A^1—X^1)_2 \quad (I)$$

wherein Z is an activating radical, $A^1$ is an aromatic radical and $X^1$ is fluoro, chloro, bromo, or nitro.

44. The method of claim 43 wherein the moiety —$A^1$—Z—$A^1$— is a bis(arylene)sulfone, bis(arylene)ketone, tris(arylene)bis(sulfone), tris(arylene)bis(ketone), bis(arylene)benzo-1,2-diazine, bis(arylene)azoxy radical, or a bisimide radical illustrated by the formula (VII):

wherein $R^8$ is a substituted or unsubstituted $C_{6-20}$ divalent aromatic hydrocarbon radical, a $C_{2-22}$ alkylene or cycloalkylene radical, a $C_{2-8}$ bis(alkylene-terminated) polydiorganosiloxane radical or a divalent radical of the formula (VIII):

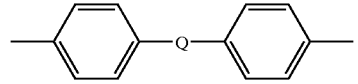

in which Q is isopropylidene, methylene,

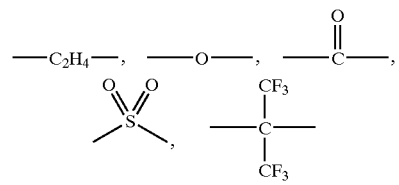

or a covalent bond, or wherein Z is polyvalent and with $A^1$ forms part of a fused ring system, a benzimidazole, benzoxazole, quinoxaline or benzofuran.

45. The method of claim 42 wherein the aromatic polyether is selected from the group consisting of polyethersulfones, polyetherketones, polyetheretherketones, and polyetherimides.

46. The method of claim 45 wherein the aromatic polyether is an aromatic polyetherimide.

47. The method of claim 46 wherein the aromatic polyetherimide comprises the reaction product of a bisphenol A moiety with at least one of 1,3-bis[N-(4-chlorophthalimido)]benzene, 1,4-bis[N-(4-chlorophthalimido)]benzene, 1,3-bis[N-(3-chlorophthalimido)]benzene, 1,4-bis[N-(3-chlorophthalimido)]benzene, 1-[N-(4-chlorophthalimido)]-3-[N-(3-chlorophthalimido)benzene, or 1-[N-(4-chlorophthalimido)]-4-[N-(3-chlorophthalimido)benzene.

48. The method of claim 42 wherein the catalyst is at least one member selected from the group consisting of hexaalkylguanidinium salts and alpha,omega-bis(pentaalkylguanidinium)alkane salts.

49. The method of claim 42 wherein the mixture is quenched with acid.

50. The method of claim 49 wherein the acid is selected from the group consisting of organic acids, acetic acid, inorganic acids, phosphorous acid, phosphoric acid, and hydrochloric acid.

51. The method of claim 42 wherein the organic phase after any contact with and separation from water is heated to a temperature in a range of between about 110° C. and about 150° C. and then cooled to less than 110° C. before any subsequent contact with and separation from water.

52. The method of claim 42 wherein the organic solvent is o-dichlorobenzene.

53. The method of claim 42 wherein the alkali metal halide is sodium chloride.

54. The method of claim 42 wherein the solid separation step comprises at least one of a filtration step, a centrifugation step, or a decantation step.

55. The method of claim 42 wherein the phases are mixed and heated to a temperature between the boiling point of water and the boiling point of organic phase under the prevailing pressure before at least one solid separation step.

56. The method of claim 55 wherein a portion of alkali metal halide is in a form that can be separated in a solid separation step following the application of heat.

57. The method of claim 54 wherein a solid separation step comprises a filtration step performed at a temperature in a range of about between about 25° C. and about 220° C.

58. The method of claim 57 wherein the filtration step is performed at a temperature in a range of between about 60° C. and about 180° C.

59. The method of claim 42 further comprising the step of treating the organic phase at least once with a solid medium to adsorb catalyst species.

60. The method of claim 59 wherein at least one catalyst is recovered from the solid medium after solid separation.

61. The method of claim 60 wherein the catalyst is at least one member selected from the group consisting of hexaalkylguanidinium salts and alpha,omega-bis(pentaalkylguanidinium)alkane salts.

62. The method of claim 60 in which the solid medium comprises silica.

63. A method for purifying a mixture comprising (i) an aromatic polyetherimide comprising the reaction product of bisphenol A disodium salt and at least one of 1,3-bis[N-(4-chlorophthalimido)]benzene or 1,3-bis[N-(3-chlorophthalimido)]benzene, (ii) hexaethylguanidinium chloride catalyst, (iii) sodium chloride, and (iv) o-dichlorobenzene, comprising the steps of:
(a) providing to the mixture an amount of water in a range between about 0.005 wt. % and about 10 wt. % based on weight of polyether, followed by;
(b) mixing the phases, wherein a portion of alkali metal halide is in a form that can be separated by a solid separation step following mixing; and
(c) subjecting the mixture to at least one solid separation step.

64. The method of claim 63 wherein the mixture is quenched with acid.

65. The method of claim 64 wherein the acid is selected from the group consisting of organic acids, acetic acid, inorganic acids, phosphorous acid, phosphoric acid, and hydrochloric acid.

66. The method of claim 63 wherein the solid separation step comprises a filtration step performed at a temperature in a range of about between about 25° C. and about 220° C.

67. The method of claim 63 further comprising the step of treating the organic phase at least once with silica gel to adsorb catalyst species.

68. The method of claim 1 wherein contacting the organic solution at least once with water and separating the water-containing phase from the organic phase comprises using at least one of a liquid/liquid centrifuge, a solid/liquid centrifuge, a counter-current contact apparatus, a liquid-liquid extractor, a liquid-liquid continuous extractor, an extraction column, a static mixer, a coalescer, a homogenizer, or a mixing/settling vessel.

69. The method of claim 25 wherein the ion exchange step follows the solid separation step.

70. The method of claim 39 wherein contacting the organic solution at least once with water and separating the water-containing phase from the organic phase comprises using at least one of a liquid/liquid centrifuge, a solid/liquid centrifuge, a counter-current contact apparatus, a liquid-liquid extractor, a liquid-liquid continous extractor, an extraction column, a static mixer, a coalescer, a homogenezer, or a mixing/settling vessel.

71. The method of claim 42 wherein water is provided to the mixture as a consequence of at least one step of contacting the organic phase with water and separating the water-containing phase from the organic phase.

72. The method of claim 63 wherein water is provided to the mixture as a consequence of at least one step of contacting the organic phase with water and separating the water-containing phase from the organic phase.

73. The method of claim 63 wherein the temperature of the mixture is raised to between the boiling point of water and the boiling point of the organic solvent under the prevailing pressure before the solid separation step.

74. A method for purifying a mixture comprising (i) an aromatic polyetherimide comprising the reaction product of bisphenol A disodium salt and at least one of 1,3-bis[N-(4-chlorophthalimido)]benzene or 1,3-bis[N-(3-chlorophthalimido)]benzene (ii) a hexaethylguanidinium chloride catalyst, (iii) sodium chloride, and (iv) o-dichlorobenzene, comprising the steps of:
(a) subjecting the mixture to at least one solid separation step, followed by;
(b) quenching the mixture with acid; and
(c) contacting the organic solution at least once with water and separating the water-containing phase from the organic phase.

75. The method of claim 74 wherein the solid separation step comprises a filtration step performed at a temperature in a range of between about 25° C. and about 220° C.

76. The method of claim 74 wherein the acid is selected from the group consisting of organic acids, acetic acid, inorganic acids, phosphorous acid, phosphoric acid, and hydrochloric acid.

77. The method of claim 74 wherein the water phase is treated to recover hexaethylguanidinium chloride catalyst.

78. The polyetherimide product purified by the method of claim 74 containing less than 100 ppm sodium.

79. A method for purifying a mixture comprising (i) an aromatic polyetherimide comprising the reaction product of bisphenol A disodium salt and at least one of 1,3-bis[N-(4-chlorophthalimido) benzene or 1,3-bis[N-(3-chlorophthalimido)]benzene, (ii) a hexaethylguanidinium chloride catalyst, (iii) sodium chloride, and (iv) o-dichlorobenzene, comprising: at least one solid separation step, and at least one ion exchange step, comprising an ion exchange resin.

80. The method of claim 79 wherein the solid separation step comprises a filtration step performed at a temperature in a range of between about 25° C. and about 220° C.

81. The method of claim 79 wherein the ion exchange resin is treated to recover catalyst.

82. The method of claim 79 wherein the ion exchange step follows the solid separation step.

83. The polyetherimide product purified by the method of claim 79 containing less than 100 ppm sodium.

84. A method for purifying a mixture comprising (i) an aromatic polyether reaction product made by a halide displacement polymerization process, (ii) a catalyst, (iii) an alkali metal halide, and (iv) a substantially water-immiscible organic solvent with boiling point at atmospheric pressure of greater than 110° C. and a density ratio to water of greater than 1.1:1 at 20-25° C., comprising the steps of:

(a) quenching the mixture with acid, followed by;
(b) subjecting the mixture to at least one solid separation step, followed by;
(c) contacting the organic solution at least once with water and separating the water-containing phase from the organic phase.

85. The method of claim 84 wherein the aromatic polyether comprises the reaction product of at least one alkali metal salt of a dihydroxy-substituted aromatic hydrocarbon with at least one substituted aromatic compound of the formula (I):

wherein Z is an activating radical, $A^1$ is an aromatic radical and $X^1$ is fluoro, chloro, bromo, or nitro.

86. The method of claim 85 wherein the moiety —$A^1$—Z—$A^1$— is a bis(arylene)sulfone, bis(arylene) ketone, tris(arylene)bis(sulfone), tris(arylene)bis(ketone), bis(arylene)benzo-1,2-diazine, bis(arylene)azoxy radical, or a bisimide radical illustrated by the formula (VII):

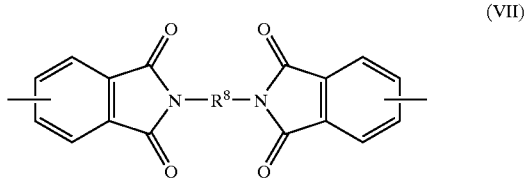

wherein $R^8$ is a substituted or or unsubstituted $C_{6-20}$ divalent aromatic hydrocarbon radical, a $C_{2-22}$ alkylene or cycloalkylene radical, a $C_{2-8}$ bis(alkylene-terminated) polydiorganosiloxane radical or a divalent radical of the formula (VIII):

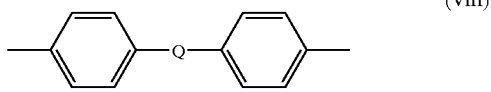

in which Q is isopropylidene, methylene,

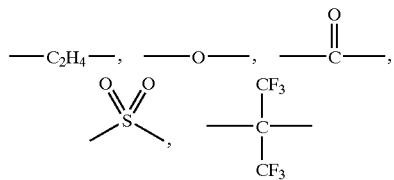

or a covalent bond, or
wherein Z is polyvalent and with $A^1$ forms part of a fused ring system, a benzimidazole, benzoxazole, quinoxaline or benzofuran.

87. The method of claim 84 wherein the aromatic polyether is selected from the group consisting of polyethersulfones, polyetherketones, polyetheretherketones, and polyetherimides.

88. The method of claim 87 wherein the aromatic polyether is an aromatic polyetherimide.

89. The method of claim 88 wherein the aromatic polyetherimide comprises the reaction product of a bisphenol A moiety with at least one of 1,3-bis[N-(4- chlorphthalimido)]benzene, 1,4-bis[N-(4-chlorophthalimido)]benzene, 1,3-bis] N-(3-chlorophthalimido)]benzene, 1,4-bis[N-(3-chlorophthalimido)]benzene, 1[N-(4-chlorophthalimido)]-3-[N-(3-chlorophthalimido)benzene, or 1-[N-(4-chlorophthalimido)]-4-[N-(3-chlorophtalimido)benzene.

90. The method of claim 84 wherein the catalyst is at least one member selected from the group consisting of hexaalkylguanidinium salts and alpha,omega-bis(pentaalkylguanidinium)alkane salts.

91. The method of claim 84 wherein the alkali metal halide is sodium chloride.

92. The method of claim 84 wherein a solid separation step comprises at least one of a filtration step, a centrifugation step, or a decantation step.

93. The method of claim 92 wherein a solid separation step comprises a filtration step performed at a temperature in a range of between about 25° C. and about 220° C.

94. The method of claim 93 wherein a filtration step is performed at a temperature in a range of between about 60° C. and about 180° C.

95. The method of claim 92 wherein a solid seperation step is performed using at least one of a dead-end filter, cross-flow filter, liquid-solid cyclone separator, vacuum drum filter, bac centrifuge, or vacuum conveyor belt separator.

96. The method of claim 84 wherein the acid is selected from the group consisting of organic acids, acetic acid, inorganic acids, phosphorous acid, phosphoric acid, and hydrochloric acid.

97. The method of claim 84 wherein the organic solvent is o-dichlorobenzene.

98. The method of claim 84 wherein the mixture is mixed and heated to a temperature between the boiling point of water and the boiling point of the organic solvent under the prevailing pressure before at least one solid separation step.

99. The method of claim 98 wherein the organic solvent is heated to a temperature in a range between about 110° C. and about 180° C. at atmospheric pressure.

100. The method of claim 98 wherein a portion of alkali metal halide is in a form that can be separated in a solid separation step following application of heat.

101. The method of claim 84 wherein the mixture is treated at least once with a solid medium to adsorb catalyst species before a solid separation step.

102. The method of claim 101 wherein the mixture is treated at least once with a solid medium to adsorb catalyst species after substantial removal of alkali metal halide from the phase.

103. The method of claim 101 wherein at least one catalyst is recovered from the solid medium after solid separation.

104. The method of claim 103 wherein the catalyst is at least one member selected from the group consisting of hexaalkylguanidinium salts and alpha,omega-bis(pentaalkylguanidinium)alkane salts.

105. The method of claim 101 in which the solid medium comprises silica.

106. The method of claim 84 wherein the water phase is treated to recover catalyst.

107. The method of claim 106 wherein the catalyst is at least one member selected from the group consisting of hexaalkylguanidinium salts and alpha,omega-bis(pentaalkylguanidinium) alkane salts.

108. A method for purifying a mixture comprising (i) an aromatic polyetherimide comprising the reaction product of bisphenol A disodium salt and at least one of 1,3-bis[N-(4-chlorophthalimido) benzene or 1,3-bis[N-(3-chlorophthalimido)]benzene, (ii) a hexaethylguanidinium chloride catalyst, (iii) sodium chloride, and (iv) o-dichlorobenzene, comprising the steps of:

(a) quenching the mixture with acid, followed by:
(b) subjecting the mixture to at least one solid separation step; and
(c) contacting the organic solution at least once with water and separating the water-containing phase from the organic phase.

109. The method of claim 108 wherein the solid separation step comprises a filtration step performed at a temperature in a range of between about 25° C. and about 220° C.

110. The method of claim 108 wherein the acid is selected from the group consisting of organic acids, acetic acid, inorganic acids, phosphorous acid, phosphoric acid, and hydrochloric acid.

111. The method of claim 108 wherein the water phase is treated to recover hexaethylguanidinium chloride catalyst.

112. The polyetherimide product purified by the method of claim 108 containing less than 100 ppm sodium.

* * * * *